US010127393B2

(12) United States Patent
Ferraiolo et al.

(10) Patent No.: US 10,127,393 B2
(45) Date of Patent: Nov. 13, 2018

(54) NEXT GENERATION ACCESS CONTROL SYSTEM AND PROCESS FOR CONTROLLING DATABASE ACCESS

(71) Applicant: THE UNITED STATES OF AMERICA, AS REPRESENTED BY THE SECRETARY OF COMMERCE NATIONAL INSTITUTE OF STANDARDS AND TECHNOLOGY, Washington, DC (US)

(72) Inventors: David Ferraiolo, Leesburg, VA (US); Serban Gavrila, Chevy Chase, MD (US); Gopi Katwala, Gaithersburg, MD (US); Joshua Roberts, Potomac Falls, VA (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 282 days.

(21) Appl. No.: 15/215,556

(22) Filed: Jul. 20, 2016

(65) Prior Publication Data
US 2017/0024572 A1   Jan. 26, 2017

Related U.S. Application Data

(60) Provisional application No. 62/194,347, filed on Jul. 20, 2015.

(51) Int. Cl.
G06F 21/62 (2013.01)
G06F 21/60 (2013.01)
G06F 17/30 (2006.01)

(52) U.S. Cl.
CPC ...... *G06F 21/604* (2013.01); *G06F 17/30165* (2013.01); *G06F 17/30365* (2013.01);
(Continued)

(58) Field of Classification Search
CPC ..... G06F 21/62; G06F 17/30286; H04L 63/10
See application file for complete search history.

(56) References Cited

U.S. PATENT DOCUMENTS 6,064,656 A * 5/2000 Angal ................. G06F 21/6218
370/254
8,346,791 B1  1/2013 Shukla et al.
(Continued)

*Primary Examiner* — Izunna Okeke
(74) *Attorney, Agent, or Firm* — Office of Chief Counsel for National Institute of Standards and Technology

(57) ABSTRACT

A computer-implemented method included: receiving, by an access manager, a query from a source; communicating the query from the access manager to a translator; translating the query into a next generation access control (NGAC) input; communicating the NGAC input to an NGAC engine, the NGAC engine including access control data; receiving the NGAC input; determining an authorization response; communicating the authorization response to the translator; translating the authorization response into a response statement; communicating the response statement to the access manager; communicating, if the response statement comprises a permitted statement: a permitted query to a database from the access manager, the permitted query comprising a data operation; and performing the data operation on data in the database; and blocking access by the source to data in the database if the response statement comprises a deny statement.

20 Claims, 18 Drawing Sheets

(52) U.S. Cl.
CPC .. *G06F 17/30424* (2013.01); *G06F 17/30595* (2013.01); *G06F 21/6227* (2013.01)

(56) References Cited

U.S. PATENT DOCUMENTS

| | | |
|---|---|---|
| 8,515,948 B2 | 8/2013 | Chen et al. |
| 9,002,867 B1 | 4/2015 | Adams et al. |
| 9,037,610 B2 | 5/2015 | Rissanen |

\* cited by examiner

| Name | Phone | SSN | Salary |
|---|---|---|---|
| Bob | 301-976-4454 | 122-54-4537 | $38,341 |
| Alice | 301-976-3042 | 945-39-4034 | $72,440 |
| Tom | 301-976-2067 | 304-75-3995 | $62,550 |

Some Employee Records

User access capabilities:

| Name | Phone | SSN | Salary |
|---|---|---|---|
| Bob * | 301-976-4454 * | 122-54-4537 | $38,341 |
| Alice | 301-976-3042 | | |
| Tom | 301-976-2067 | | | u1 (Bob, Staff)

| Name | Phone | SSN | Salary |
|---|---|---|---|
| Bob | 301-976-4454 | | $38,341 |
| Alice * | 301-976-3042 * | 945-39-4034 | $72,440 |
| Tom | 301-976-2067 | | $62,550 | u2 (Alice, Staff, Gr2Mng)

| Name | Phone | SSN | Salary |
|---|---|---|---|
| Bob | 301-976-4454 | 122-54-4537 * | $38,341 * |
| Alice | 301-976-3042 | 945-39-4034 * | $72,440 * |
| Tom | 301-976-2067 | 304-75-3995 * | $62,550 * | u3 (HR, Staff)

NEXT GENERATION ACCESS CONTROL SYSTEM AND PROCESS FOR CONTROLLING DATABASE ACCESS

CROSS REFERENCE TO RELATED APPLICATIONS

This application claims the benefit of U.S. Provisional Patent Application Ser. No. 62/194,347, filed Jul. 20, 2015, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a computer-implemented method, comprising: receiving, by an access manager, a query from a source; communicating the query from the access manager to a translator; translating, by the translator, the query into a next generation access control (NGAC) input; communicating the NGAC input to an NGAC engine, the NGAC engine comprising access control data (ACD); receiving, by the NGAC engine, the NGAC input; determining an authorization response by analyzing the NGAC data in response to receipt of the NGAC input by the NGAC engine; communicating the authorization response from the NGAC engine to the translator; translating, by the translator, the authorization response into a response statement; communicating the response statement to the access manager from the translator; communicating, if the response statement comprises a permitted statement: a permitted query to a database from the access manager, the permitted query comprising a data operation; and performing the data operation on data in the database; and blocking access by the source to data in the database if the response statement comprises a deny statement.

Also disclosed is a system comprising: one or more computers configured to perform operations, the operations comprising: receiving, by an access manager, a query from a source; communicating the query from the access manager to a translator; translating, by the translator, the query into a next generation access control (NGAC) input; communicating the NGAC input to an NGAC engine, the NGAC engine comprising access control data (ACD); receiving, by the NGAC engine, the NGAC input; determining an authorization response by analyzing the NGAC data in response to receipt of the NGAC input by the NGAC engine; communicating the authorization response from the NGAC engine to the translator; translating, by the translator, the authorization response into a response statement; communicating the response statement to the access manager from the translator; communicating, if the response statement comprises a permitted statement: a permitted query to a database from the access manager, the permitted query comprising a data operation; and performing the data operation on data in the database; and blocking access by the source to data in the database if the response statement comprises a deny statement.

Further disclosed is a computer-readable medium having instructions strode thereon, which, when executed by a processor, cause the processor to perform operations comprising: receiving, by an access manager, a query from a source; communicating the query from the access manager to a translator; translating, by the translator, the query into a next generation access control (NGAC) input; communicating the NGAC input to an NGAC engine, the NGAC engine comprising access control data (ACD); receiving, by the NGAC engine, the NGAC input; determining an authorization response by analyzing the NGAC data in response to receipt of the NGAC input by the NGAC engine; communicating the authorization response from the NGAC engine to the translator; translating, by the translator, the authorization response into a response statement; communicating the response statement to the access manager from the translator; communicating, if the response statement comprises a permitted statement: a permitted query to a database from the access manager, the permitted query comprising a data operation; and performing the data operation on data in the database; and blocking access by the source to data in the database if the response statement comprises a deny statement.

BRIEF DESCRIPTION OF THE DRAWINGS

The following descriptions should not be considered limiting in any way. With reference to the accompanying drawings, like elements are numbered alike.

FIG. 17 shows exemplary records with data content and access capabilities for users u1, u2, and u3 under the access control policy shown in FIG. 16.

DETAILED DESCRIPTION

Figure 1:
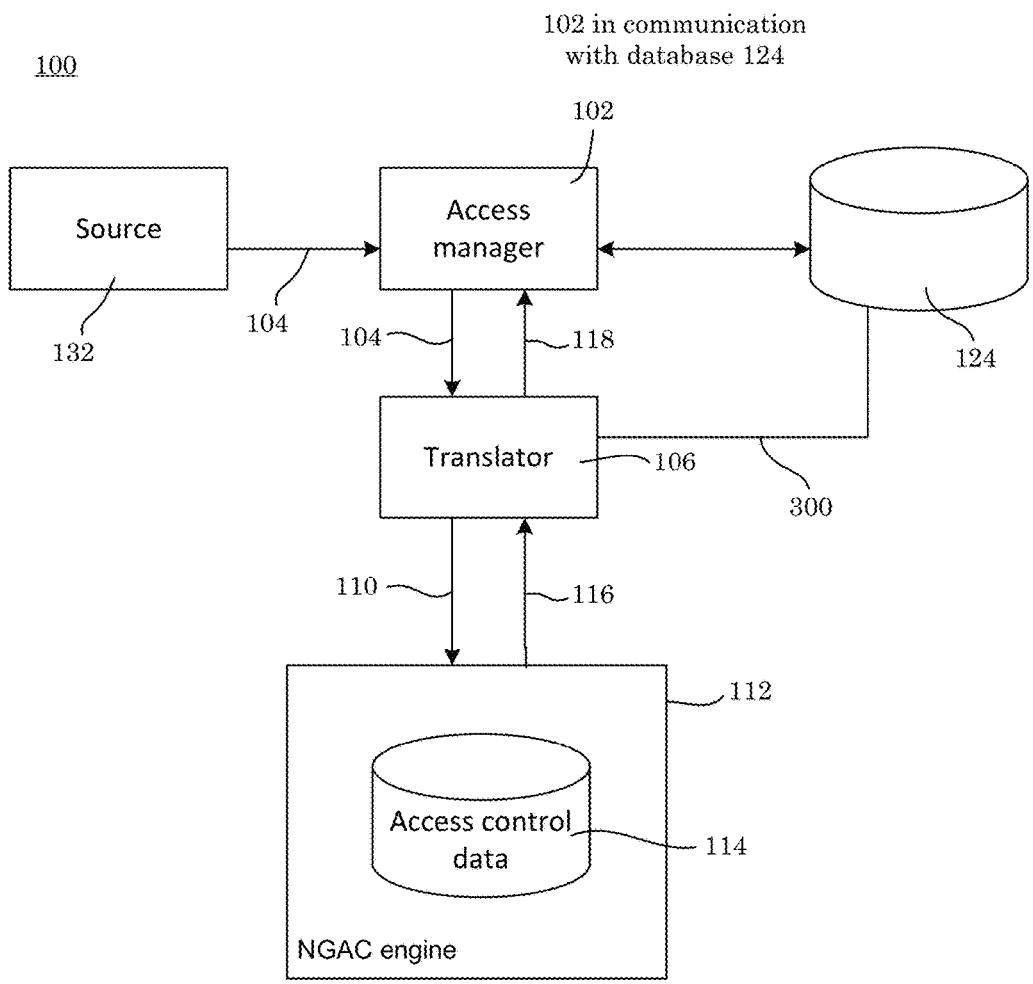
FIG. 1 shows a next generation access control system.

A detailed description of one or more embodiments is presented herein by way of exemplification and not limitation.

Data stored in databases can be accessed under a certain policy. The database can be, for example, a relational database. In relational databases, most of the data is stored as rows in one or more tables. The databases can be accessed by an entity. Due to the nature of data stored in databases, authorizing discriminatory access (e.g., no access, read access, or read/write access) to the data is of significant importance.

Relational databases perform associative queries over tables. Moreover, relational database organize data in rows and columns of one or more tables or table objects. Sets of data stored in tables in the database can be accessed using a set processing language such as SQL (Structured Query Language). The processing language specifies the table as the source of the data and outputs only those rows that satisfy a given condition.

Enterprises such as corporate or governmental enterprises typically maintain data in a database. For both legal and business reasons, enterprises are increasingly becoming sensitive to unauthorized access to data in their databases. Advantageously, the next generation access control system herein prevents inadvertent or unauthorized access to row or column data in the database. In a relational database management system (RDBMS), table object privileges granted to a user control whether or not access to the data in the table object is allowed. In general, such privilege control does not conventionally extend to the column-level or the row-level. Beneficially and unexpectedly, the next generation access control system provides access control that extends to the column-level or the row-level in tables of the database.

With respect to authorization, coarse-grained authorization provides a simple mechanism to manage whether a user has the necessary permission to access a particular application, such as whether the user is a member of a particular group. In contrast, fine-grained authorization is a more precise mechanism to manage whether a user has the necessary permission to perform a certain action, on a resource of an application. Because fine-grained authorization is more precise than coarse-grained authorization, fine-grained authorization has more context than coarse-grained authorization. Context is defined as attributes of a subject, resource, action, or environment, that can be relevant in making a fine-grained authorization decision. The next generation access control system advantageously provides fine-grained authorization.

The SQL standard for access control is coarse grained in that the SQL standard grants access to all rows of a table or none. Fine-grained access control allows control of access at a granularity of individual rows and should be required for database applications to ensure that a user, e.g., an employee, can see only his own data, and relevant data of other employees that they manage. While fine-grained access control can be performed at a level of application programs, the next generation access control system provides access control at the database level.

In some models for fine-grained access control, e.g., Truman models, provide access control through functions that return strings containing predicates. A function is associated with each relation, and when invoked, returns a string containing predicates that enforce fine-grained access control; the function takes as input the mode of access and an application context that includes information such as user-id of the end user. In other models for access control such as extensible access control markup language (XACML, policy-based security management is provided by specification of predicates that are added to WHERE clauses. Different policies can be specified on different columns and are combined. In contrast, the next generation access control system herein provides access control at the database level involving rows and columns of tables in the database directly at the data level by generating composite objects from a database schema and expressing and enforcing control policies in terms of the composite objects using a next generation access control (NGAC) engine.

It has been discovered that embodiments herein include a process for leveraging an NGAC standard for expression and enforcing access control policies over SQL queries for accessing information, e.g., tables, records, columns, and fields in relational database management system (RDBMS) product data. By leveraging NGAC, embodiments include supporting an access control policy and maintaining system operating performance. In some embodiments, the NGAC system imposes a mandatory, discretionary, or history-based access control policy. The NGAC system also includes comprehensively enforcing access control over RDBMS and non-RDBMS data types. In some embodiments, the NGAC system includes directly implementing control in an RDBMS kernel.

In an embodiment, with reference to FIG. 1, next generation access control system 100 includes access manager 102 to receive query 104 from source 132 and in communication with database 124; translator 106 to receive query 104 from access manager 102 and to translate query 104 into next generation access control (NGAC) input 110; and NGAC engine 112 to receive NGAC input 110 from translator 110, to include access control data 114 (ACD), and to produce authorization response 116 by analyzing access control data 114 in response to receipt of NGAC input 110 from translator 106. Here, translator 106 receives authorization response 116 from NGAC engine 112, translates authorization response 116 into response statement 118, and communicates response statement 118 to access manager 102. In response to receiving response statement 118 from translator 106, access manager 102 communicates, if response statement 118 includes permitted statement 120, permitted query 122 to database 124, wherein permitted query 122 includes a data operation that is performed on data in database 124, e.g., see FIG. 3, FIG. 4, FIG. 5, FIG. 6, and FIG. 7. On the other hand, in response to receiving response statement 118 from translator 106, access manager 102 blocks access by source 132 to data in database 124 if response statement 120 includes deny statement 130, e.g., see FIG. 2.

Figure 2:
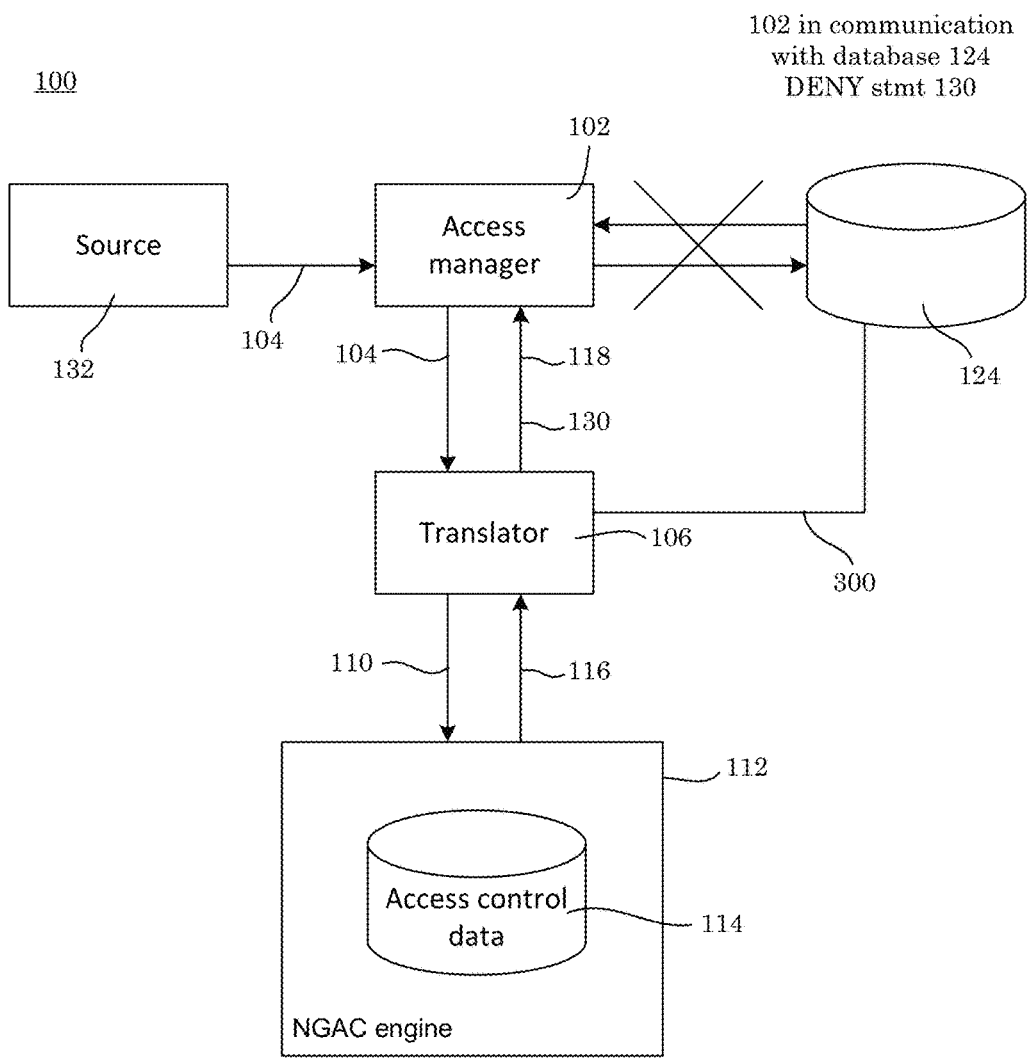
FIG. 2 shows a next generation access control system.

In an embodiment, with reference to FIG. 2, source 132 provides query 104 to access manager 102, and access manager 102 blocks source 132 from accessing data on database 124. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes deny statement 130, which is communicated from translator 106 to access manager 102. Deny statement 130 is produced in response to a content of query 104 provided from source 132. Due to receipt of deny statement 130 in response statement 118 from translator 106, access manager 102 blocks access to database 124 from source 132.

Figure 3:
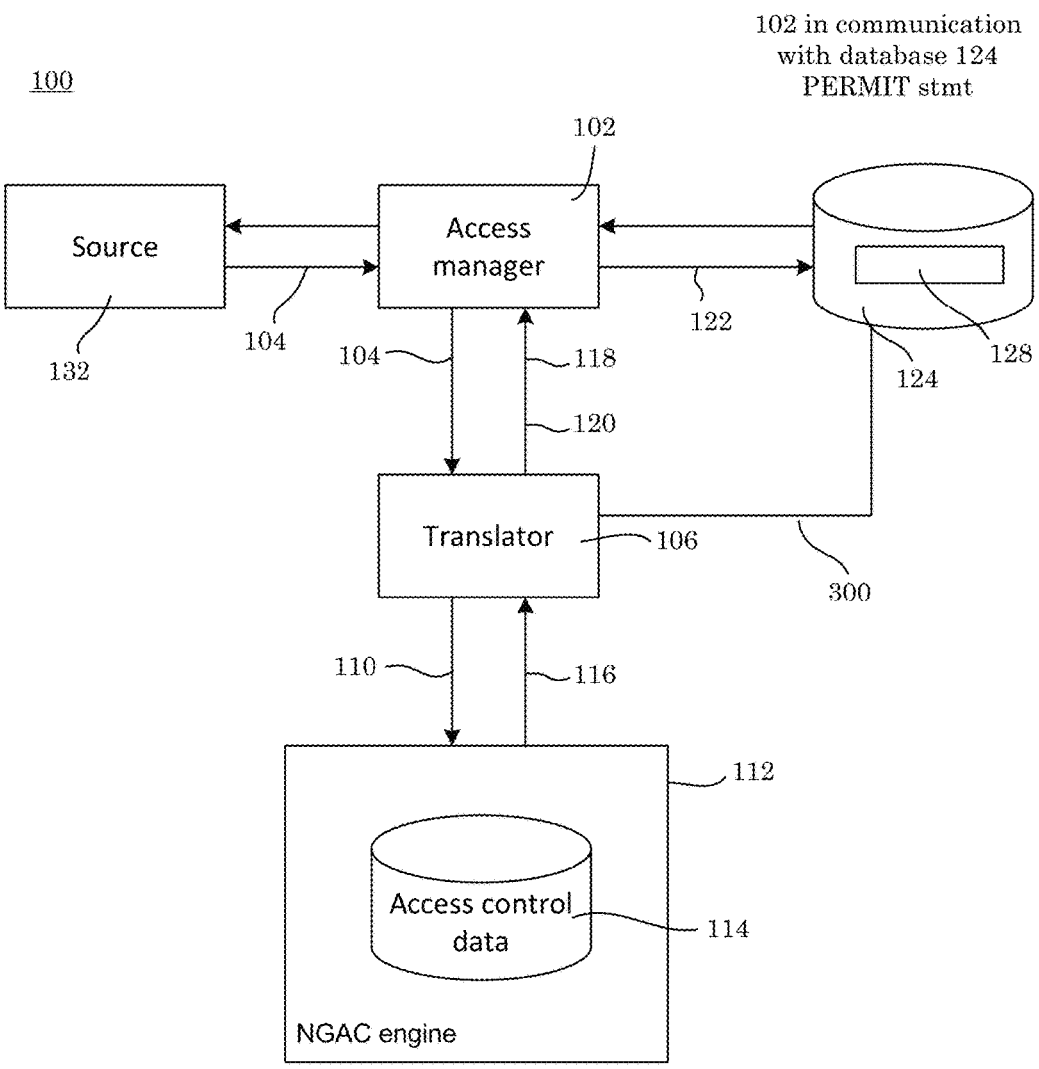
FIG. 3 shows a next generation access control system.

In an embodiment, with reference to FIG. 3, source 132 provides query 104 to access manager 102, and access manager 102 provides access to data on database 124 by source 132. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes permitted statement 120, which is communicated from translator 106 to access manager 102. Permitted statement 120 is produced in response to the content of query 104 provided from source 132. Permitted statement 120 includes permitted query 122, e.g., a SQL query that can include a query for selecting, updating, inserting, or deleting data 128 on database 124. Permitted query 122 is communicated to database 124 from access manager 102. In response to receipt of permitted query 122 database 124 performs the data operation provided in permitted query 122 on data 128.

Figure 4:
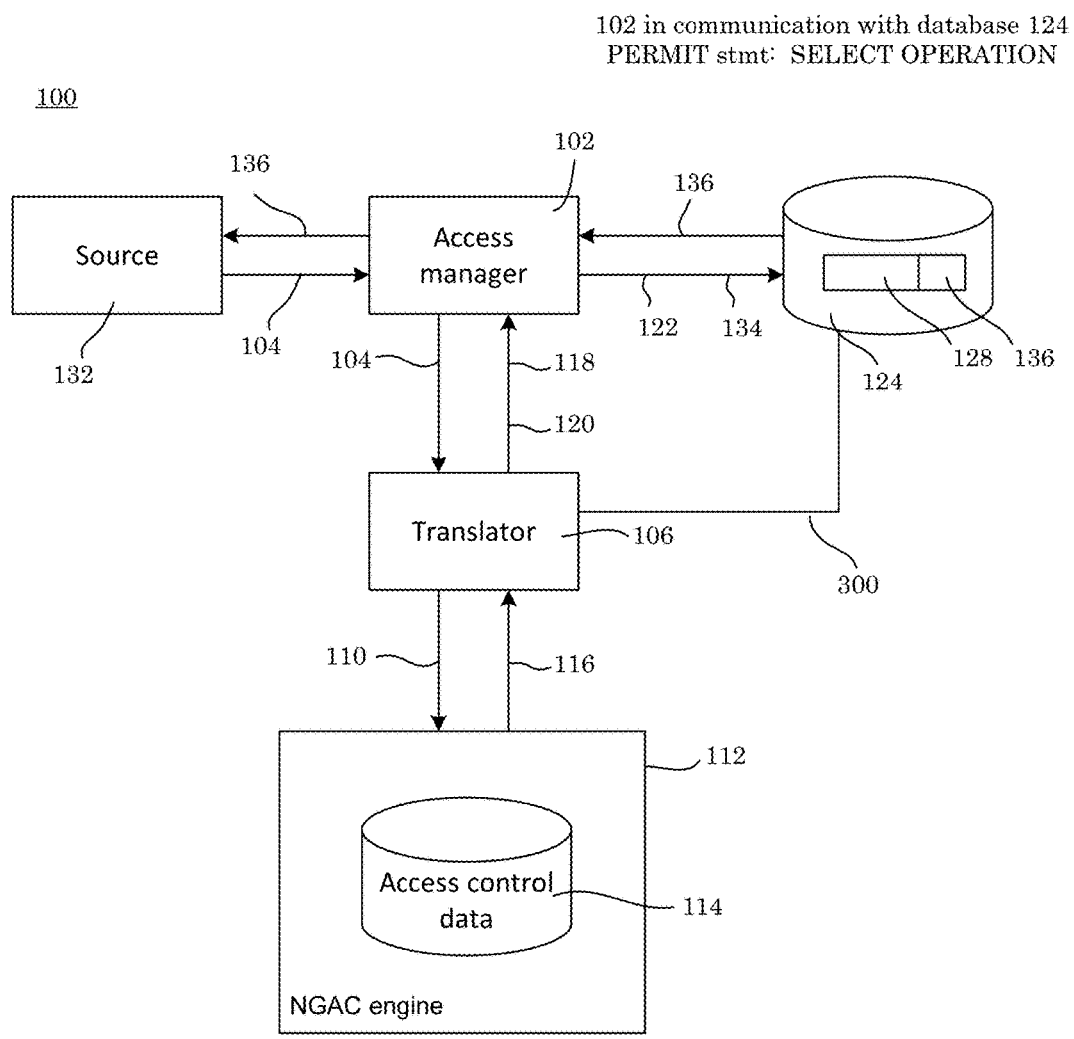
FIG. 4 shows a next generation access control system.

In an embodiment, with reference to FIG. 4, source 132 provides query 104 that includes a request to select data 128 on database 124 to access manager 102, and access manager 102 provides access to data 128 on database 124 by source 132. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes permitted statement 120, which is communicated from translator 106 to access manager 102. Permitted statement 120 is produced in response to the content of query 104 provided from source 132. Permitted statement 120 includes permitted query 122 for select operation 134 of data 128 on database 124. Permitted query 122 is communicated to database 124 from access manager 102. In response to receipt of permitted query 122 database 124 performs select operation 134 provided in permitted query 122 on data 128 to produce selected data 136. Selected data 136 is communicated from database 124 to access manager 102. Access manager 100 to receive selected data 136 and communicate selected data 136 to source 132.

Figure 5:
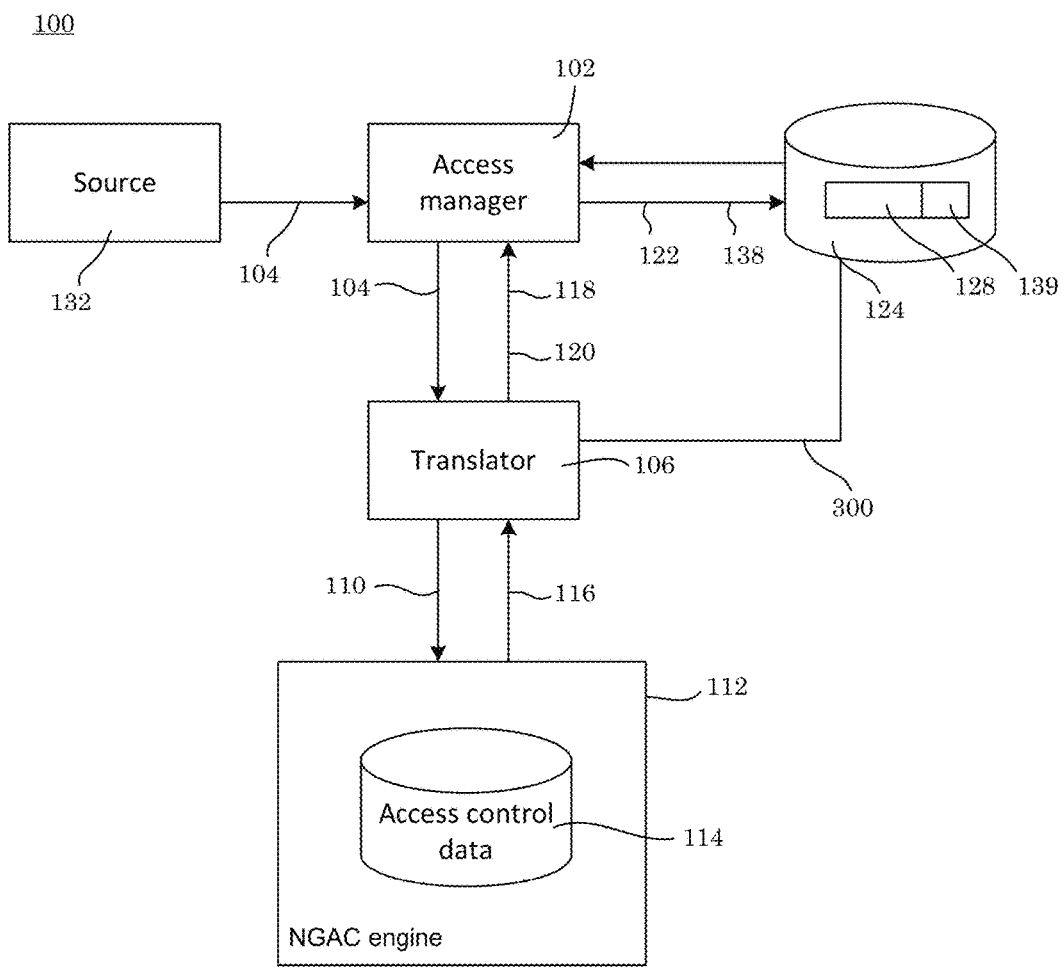
FIG. 5 shows a next generation access control system.

In an embodiment, with reference to FIG. 5, source 132 provides query 104 that includes a request to update data 128 on database 124 to access manager 102, and access manager 102 provides access to data 128 on database 124 by source 132. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes permitted statement 120, which is communicated from translator 106 to access manager 102. Permitted statement 120 is produced in response to the content of query 104 provided from source 132. Permitted statement 120 includes permitted query 122 for update operation 138 of data 128 on database 124. Permitted query 122 is communicated to database 124 from access manager 102. In response to receipt of permitted query 122 database 124 performs update operation 138 provided in permitted query 122 on data 128 to produce updated data 139. In this manner, data 128 includes update data 139 by virtue of an approved access to data 128 by access manager 102 and translator 106 in combination with access control data 114 contained in NGAC engine 112 in view of query 104 made by source 132. It should be appreciated that updated data 139 replaces former data included as part of data 128 on database 124 prior to receipt of update operation 138 with permitted query 122 from access manager 102.

Figure 6:
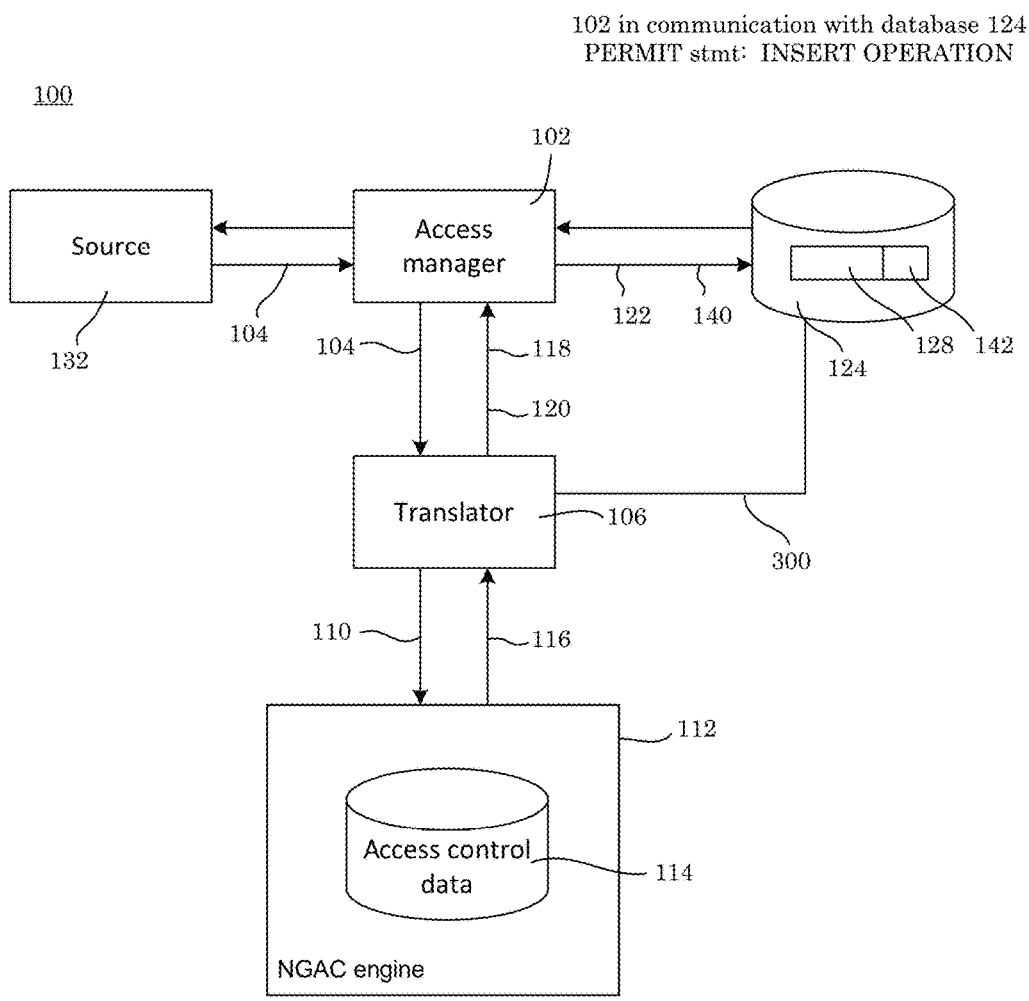
FIG. 6 shows a next generation access control system.

In an embodiment, with reference to FIG. 6, source 132 provides query 104 that includes a request to insert new data on database 124 to access manager 102, and access manager 102 provides access to data 128 on database 124 by source 132. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes permitted statement 120, which is communicated from translator 106 to access manager 102. Permitted statement 120 is produced in response to the content of query 104 provided from source 132. Permitted statement 120 includes permitted query 122 with insert operation 140 to insert data into data 128 on database 124. Permitted query 122 is communicated to database 124 from access manager 102. In response to receipt of permitted query 122 database 124 performs insert operation 140 provided in permitted query 122 on data 128 to produce inserted data 142. In this manner, data 128 includes inserted data 142 by virtue of an approved access to data 128 by access manager 102 and translator 106 in combination with access control data 114 contained in NGAC engine 112 in view of query 104 made by source 132. It should be appreciated that inserted data 142 inserts new data into data 128 on database 124.

Figure 7:
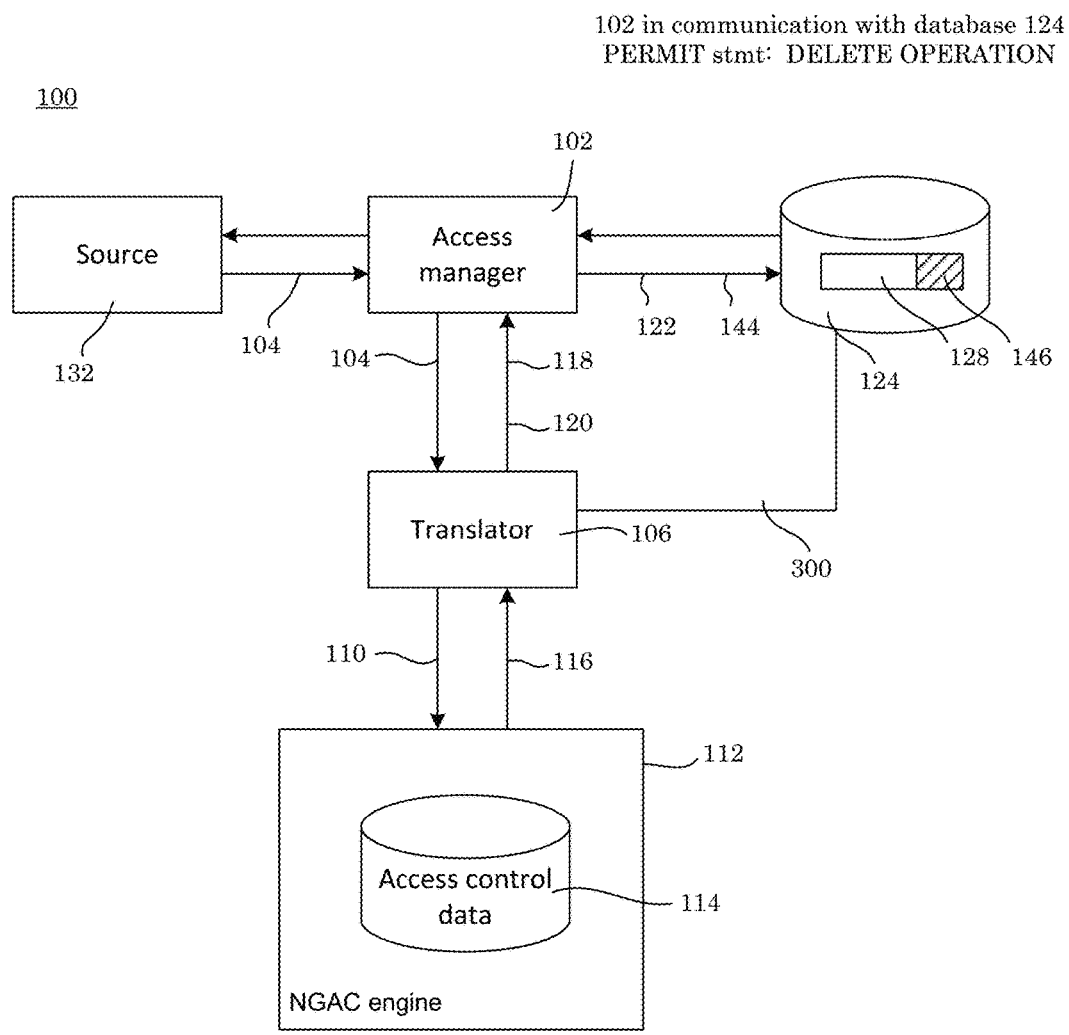
FIG. 7 shows a next generation access control system.
Figure 8:
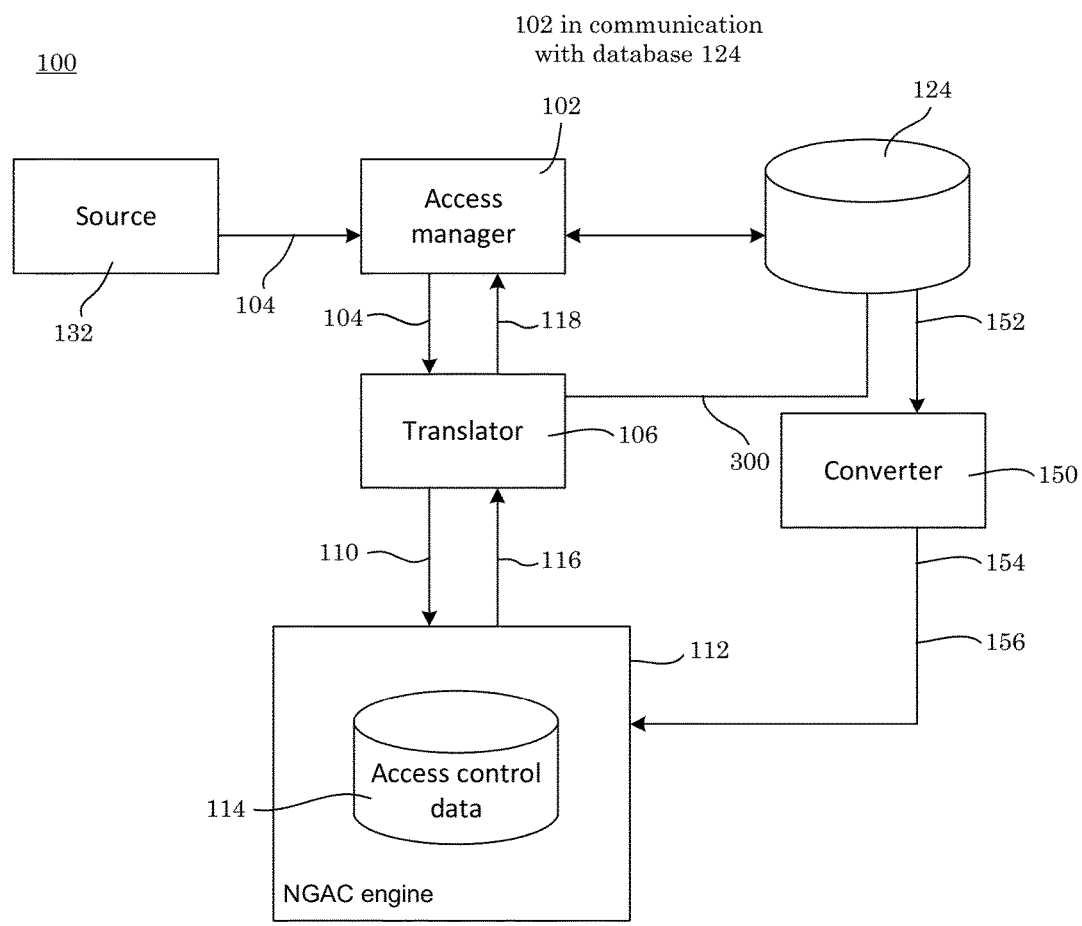
FIG. 8 shows a next generation access control system.
Figure 9:
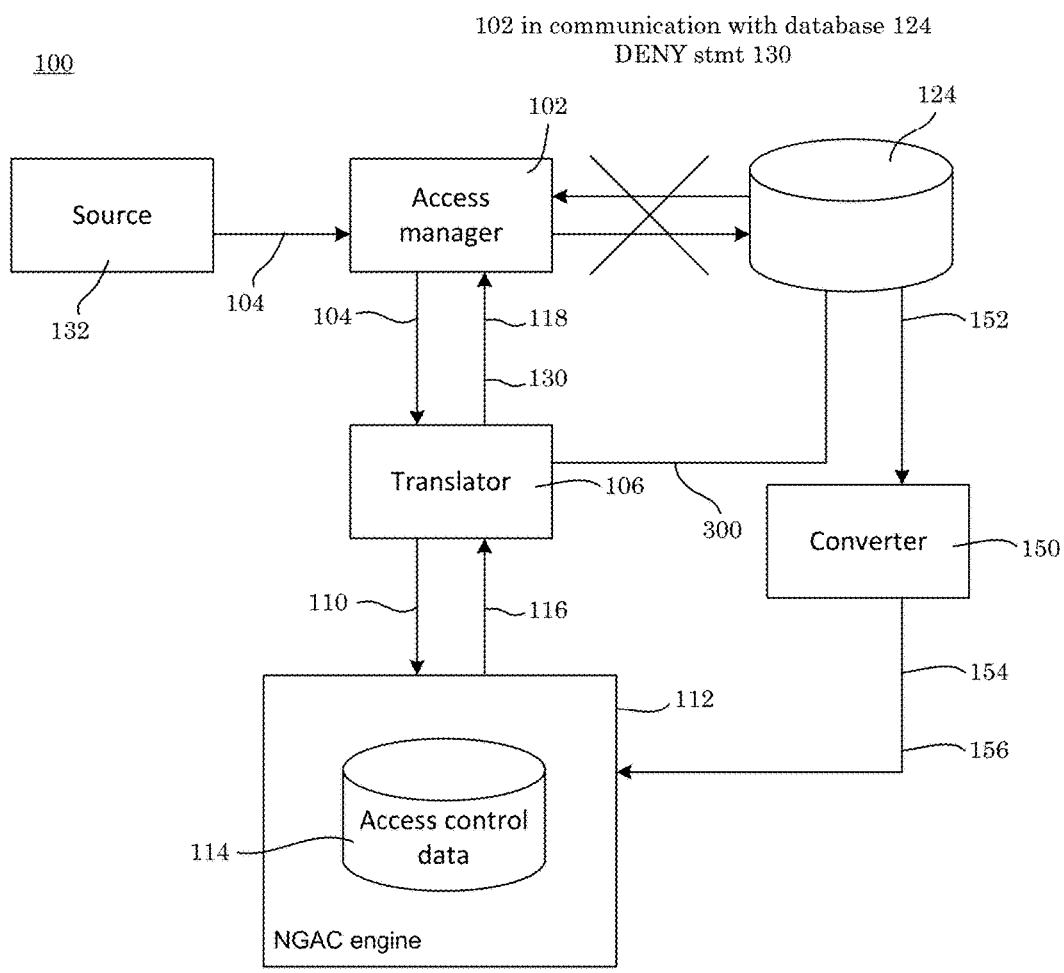
FIG. 9 shows a next generation access control system.
Figure 10:
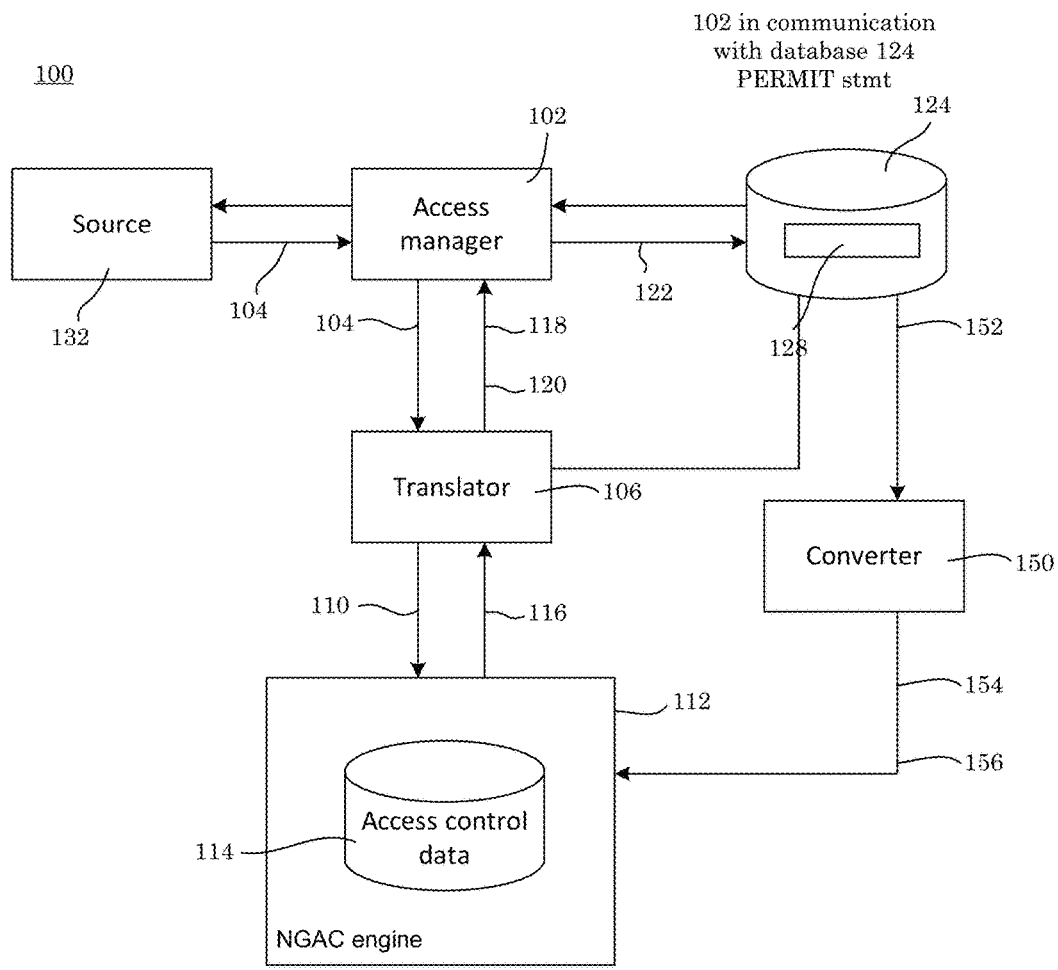
FIG. 10 shows a next generation access control system.

In an embodiment, with reference to FIG. 7, source 132 provides query 104 that includes a request to delete data 128 on database 124 to access manager 102, and access manager 102 provides access to data 128 on database 124 by source 132. Here, query 104 is received by access manager 102 that provides query 104 to translator 106 that produces NGAC input 110 received by NGAC engine 112. NGAC engine 112 analyzes NGAC input 110 based on access control data 114 and produces authorization response 116 that is communicated to translator 106. Translator 106 translates authorization response 116 and produces response statement 118 that includes permitted statement 120, which is communicated from translator 106 to access manager 102. Permitted statement 120 is produced in response to the content of query 104 provided from source 132. Permitted statement 120 includes permitted query 122 for delete operation 144 of data 128 on database 124. Permitted query 122 is communicated to database 124 from access manager 102. In response to receipt of permitted query 122 database 124 performs delete operation 144 provided in permitted query 122 on data 128 to produce deleted data 146. In this manner, deleted data 146 is deleted from database 124 by virtue of an approved access to data 128 by access manager 102 and translator 106 in combination with access control data 114 contained in NGAC engine 112 in view of query 104 made by source 132. It should be appreciated that deleted data 146 is deleted from former data included as part of data 128 on database 124 prior to receipt of delete operation 144 with permitted query 122 from access manager 102.

According to an embodiment, with reference to FIG. 8, FIG. 9, FIG. 10, FIG. 11, FIG. 12, FIG. 13, and FIG. 14, next generation access control system 100 includes converter 150 in communication with NGAC engine 112 and database 124 to receive schema 152 from database 124 and to convert schema 152 into a plurality of object attributes 154 and NGAC assignments 156, wherein schema 152 includes a plurality of columns and tables from data 128 of database 124. Converter 150 communicates NGAC object attributes 154 and NGAC assignments 156 to NGAC engine 112 that receives NGAC object attributes 154 and NGAC assignments from converter 150, generates an access control policy from NGAC object attributes 154 and NGAC assignments 156, and stores the access control policy as access control data 114 in NGAC engine 112. In this manner, NGAC engine 112 produces authorization response 116 in response to receipt of NGAC input 110 from translator 106 by analyzing NGAC input 110 based on the access control policy stored access control data 114 in NGAC engine 112.

Figure 11:
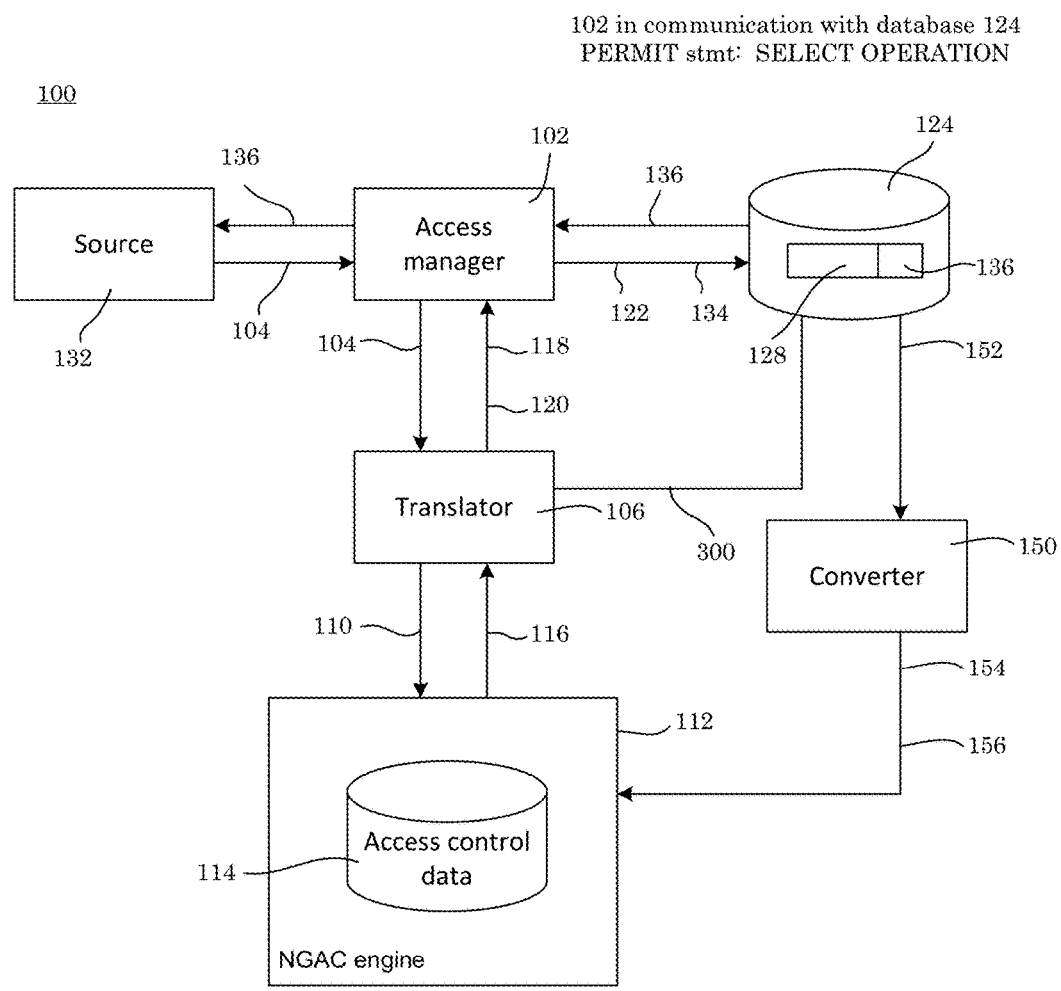
FIG. 11 shows a next generation access control system.
Figure 12:
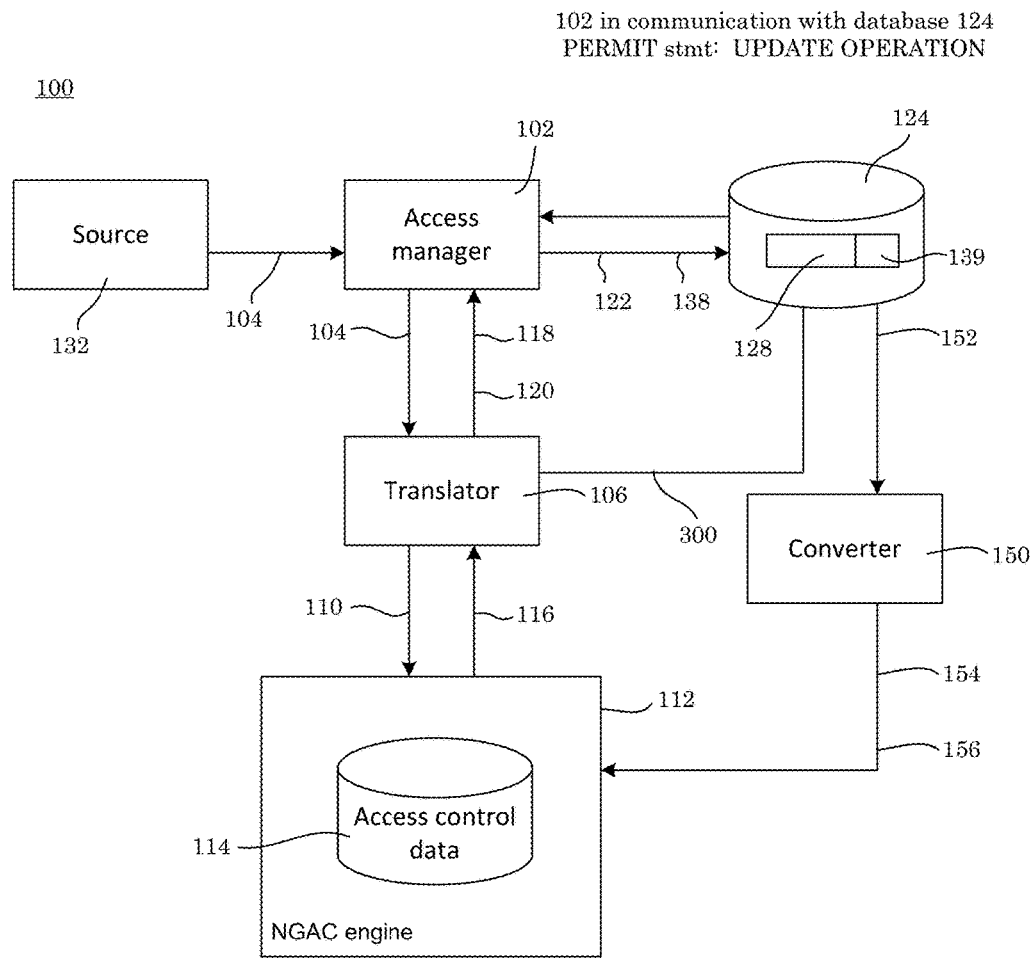
FIG. 12 shows a next generation access control system.
Figure 13:
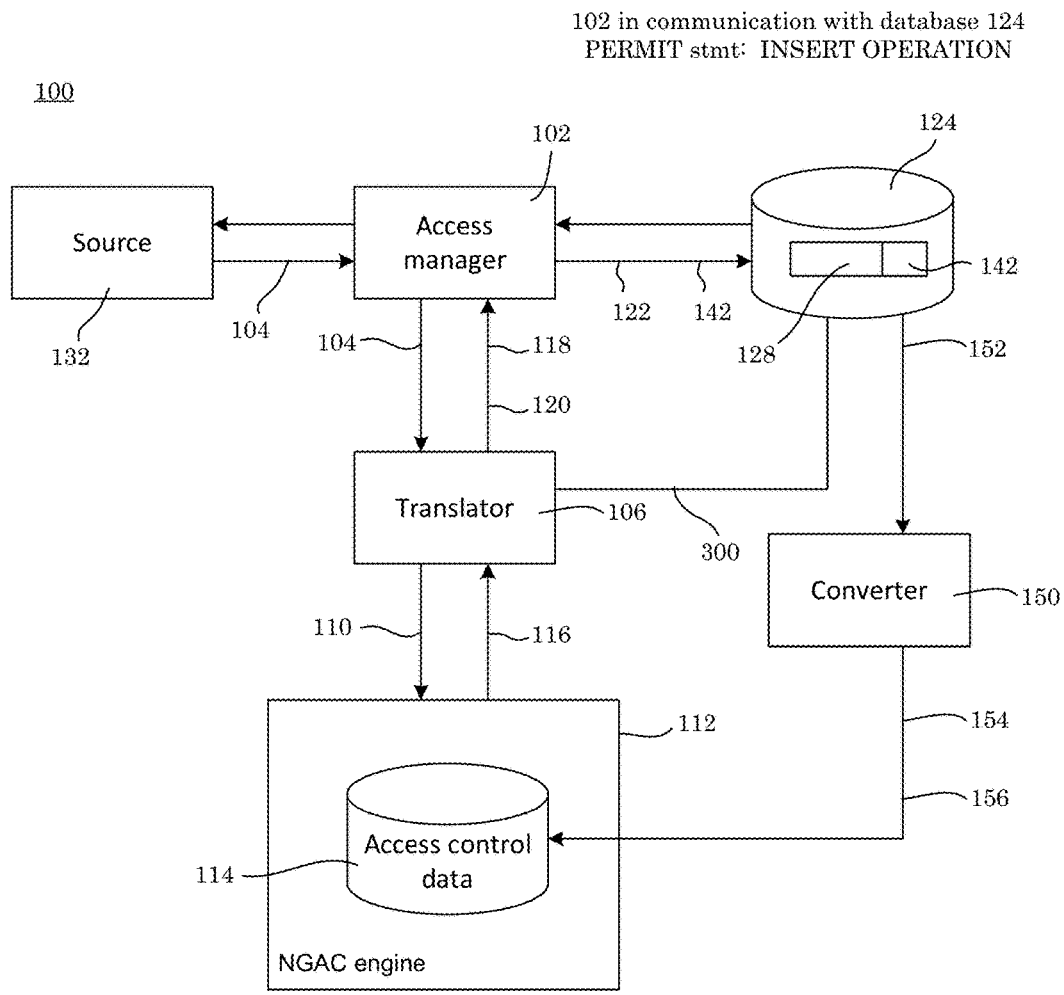
FIG. 13 shows a next generation access control system.
Figure 14:
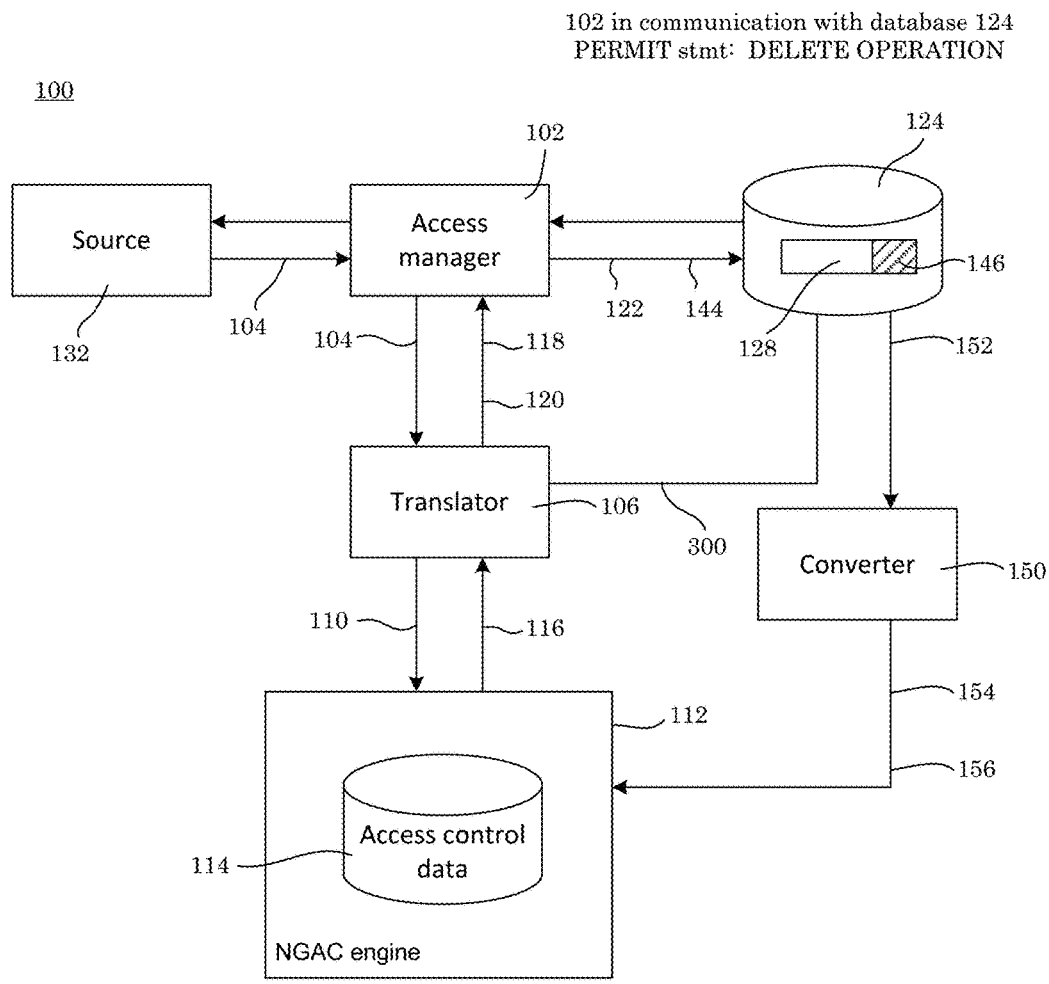
FIG. 14 shows a next generation access control system.

Here, query 104 from source 132 can include a request to modify data 128 on database 124. In an embodiment, query 104 includes a SQL query. Exemplary SQL queries include select, update, insert, delete, and the like. Depending on whether response statement 118 from translator 106 includes deny statement 130 (see FIG. 9) or permitted statement 120 (see FIG. 10), access manager 102 blocks access to database 124 by source 132 for deny statement 130 or provides access to database 124 by source 132 for permitted statement 120. Permitted statement 120 includes the data operation performed on data 128 in database 124. Exemplary data operations include select operation 134 to produce selected data 136 as shown in FIG. 11, update operation 138 to produce updated data 139 as shown in FIG. 12, insert operation 140 to insert data as inserted data 142 as shown in FIG. 13, delete operation 144 to delete deleted data 146 from data 128 on database 124 as shown in FIG. 14, and the like.

Figure 15:
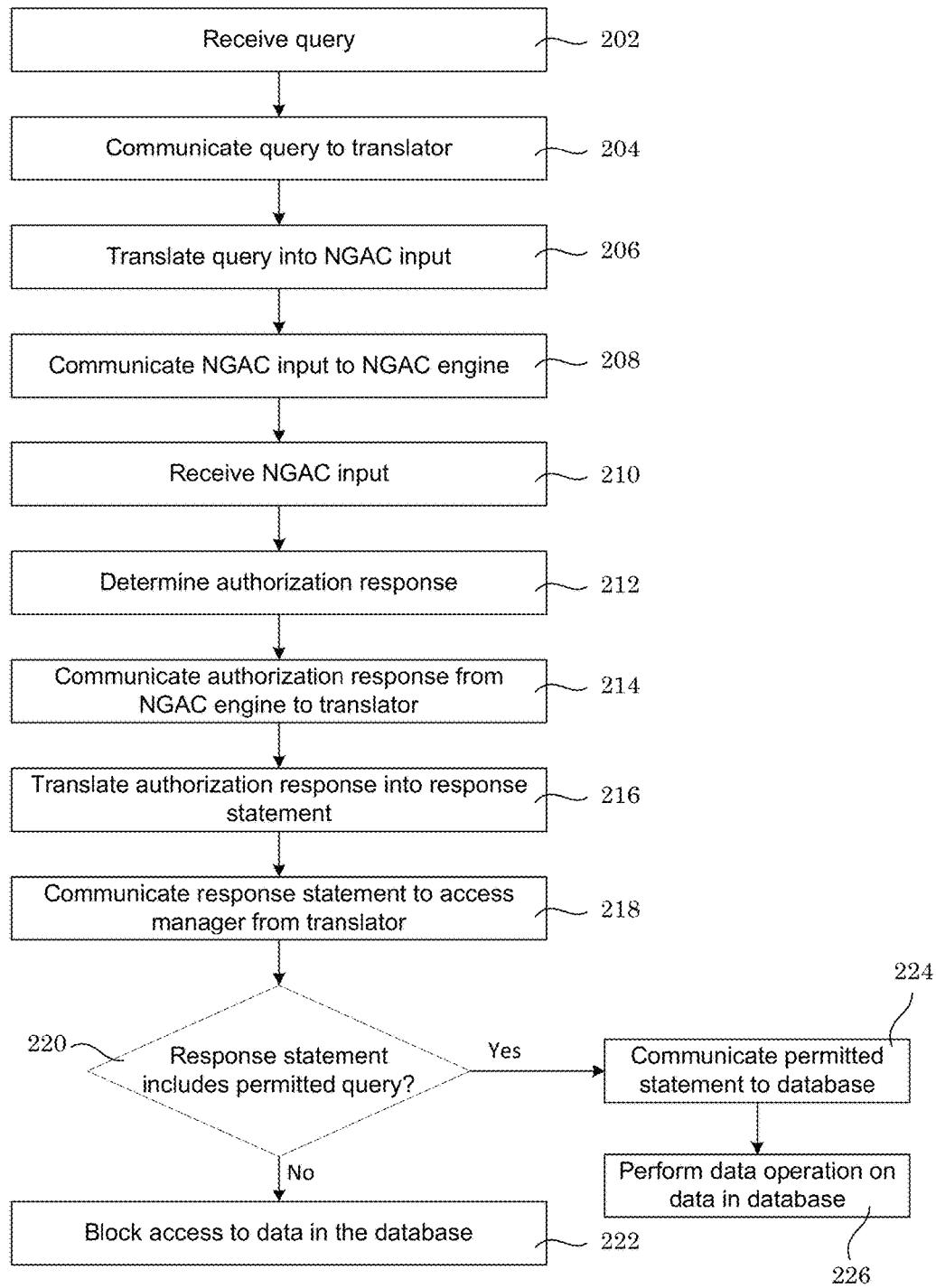
FIG. 15 shows an exemplary process for controlling access to a database.

In an embodiment, with reference to FIG. 15, a computer-implemented method includes receiving, by access manager 102, query 104 from source 132 (step 202); communicating query 104 from access manager 102 to translator 106 (step 204); translating, by translator 106, query 104 into NGAC input 110; communicating NGAC input 110 to NGAC engine 112, NGAC engine 112 including access control data 114; receiving, by NGAC engine 112, NGAC input 110; determining authorization response 116 by analyzing access control data 114 in response to receipt of NGAC input 110 by NGAC engine 112; communicating authorization response 116 from NGAC engine 112 to translator 106; translating, by translator 106, authorization response 116 into response statement 118; communicating response statement 118 to access manager 102 from translator 106; communicating, if response statement 118 includes permitted statement 120: permitted query 122 to database 124 from access manager 102, permitted query 122 including a data operation and performing the data operation on data 128 in database 124; and blocking access by source 132 to data 128 in database 124 if response statement 118 includes deny statement 130.

The method further can include communicating schema 152 from database 124 to converter 150, wherein schema 152 includes a plurality of columns and tables; receiving schema 152 by converter 150; and converting, by converter 150, schema 152 from database 124 to produce: a plurality of NGAC object attributes 154 and a plurality of NGAC assignments 156. The method further can include communicating NGAC object attributes 154 and NGAC assignments 156 from converter 150 to NGAC engine 112. The method further can include: receiving, by NGAC engine 112, NGAC object attributes 154 and NGAC assignments 156 from converter 150; and generating, by NGAC engine 112, an access control policy from NGAC object attributes 154 and NGAC assignments 156; and storing the access control policy as access control data 114 in NGAC engine 112.

In an embodiment, response statement 118 includes permitted statement 120, wherein the data operation includes select operation 134, and the method further includes performing select operation 134 on data 128 in database 124 to produce selected data 136; communicating selected data 136 to access manager 102; and communicating selected data 136 from access manager 102 to source 132 of query 104.

In an embodiment, response statement 118 includes permitted statement 120, wherein the data operation includes update operation 138, and the method further includes performing update operation 138 on data 128 in database 124 to produce updated data 139 in database 124.

In an embodiment, response statement 118 includes permitted statement 120, wherein the data operation includes insert operation 140, and the method further includes performing insert operation 140 on data 128 in database 124 to produce inserted data 142 in database 124.

In an embodiment, response statement 118 includes permitted statement 120, wherein the data operation includes delete operation 144, and the method further includes performing delete operation 144 on data 128 in database 124 to delete a portion of data 128, e.g., deleted data 146, in database 124.

In some embodiments, query 104 can include a SQL query. In a particular embodiment, database 124 is a relational database. According to an embodiment, source 132 includes a user application.

The process and articles herein have numerous beneficial uses, including a computer readable medium with instructions. In an embodiment, a computer-readable medium having instructions stored thereon, which, when executed by a processor, cause the processor to perform operations including: receiving, by access manager 102, query 104 from source 132 (step 202); communicating query 104 from access manager 102 to translator 106 (step 204); translating, by translator 106, query 104 into NGAC input 110; communicating NGAC input 110 to NGAC engine 112, NGAC engine 112 including access control data 114; receiving, by NGAC engine 112, NGAC input 110; determining authorization response 116 by analyzing access control data 114 in response to receipt of NGAC input 110 by NGAC engine 112; communicating authorization response 116 from NGAC engine 112 to translator 106; translating, by translator 106, authorization response 116 into response statement 118; communicating response statement 118 to access manager 102 from translator 106; communicating, if response statement 118 includes permitted statement 120: permitted query 122 to database 124 from access manager 102, permitted query 122 including a data operation and performing the data operation on data 128 in database 124; and blocking access by source 132 to data 128 in database 124 if response statement 118 includes deny statement 130.

The operations performed by the instructions stored on the computer-readable medium further can include communicating schema 152 from database 124 to converter 150, wherein schema 152 includes a plurality of columns and tables; receiving schema 152 by converter 150; and converting, by converter 150, schema 152 from database 124 to produce: a plurality of NGAC object attributes 154 and a plurality of NGAC assignments 156. The operations performed by the instructions stored on the computer-readable medium further can include communicating NGAC object attributes 154 and NGAC assignments 156 from converter 150 to NGAC engine 112. The method further can include: receiving, by NGAC engine 112, NGAC object attributes 154 and NGAC assignments 156 from converter 150; and generating, by NGAC engine 112, an access control policy from NGAC object attributes 154 and NGAC assignments 156; and storing the access control policy as access control data 114 in NGAC engine 112.

In an embodiment, response statement 118 includes permitted statement 120, wherein the data operation includes select operation 134, and the method further includes performing select operation 134 on data 128 in database 124 to produce selected data 136; communicating selected data 136 to access manager 102; and communicating selected data 136 from access manager 102 to source 132 of query 104.

In an embodiment, response statement 118 includes permitted statement 120, wherein the data operation includes update operation 138, and the method further includes performing update operation 138 on data 128 in database 124 to produce updated data 139 in database 124.

In an embodiment, response statement 118 includes permitted statement 120, wherein the data operation includes insert operation 140, and the method further includes performing insert operation 140 on data 128 in database 124 to produce inserted data 142 in database 124.

In an embodiment, response statement 118 includes permitted statement 120, wherein the data operation includes delete operation 144, and the method further includes performing delete operation 144 on data 128 in database 124 to delete a portion of data 128, e.g., deleted data 146, in database 124.

In some embodiments, query 104 can include a SQL query. In a particular embodiment, database 124 is a relational database. According to an embodiment, source 132 includes a user application.

As afore-mentioned, relational database management systems typically do not impose access control directly on its data. To restrict access to sensitive data that might reside in a RDBMS, controls typically are implemented at the application level. These controls take on many forms to include role-based access to "screens" with parameters that can be characterized, and subsequently used to formulate and issue SQL queries. SQL queries comprise four basic types of operations that include Select, Insert, Update, and Delete that respectively read, create, write, and delete data in tables. RDBMSs are able to specify criteria and extract or alter data that might reside in one or more tables. Advantageously and unexpectedly, next generation access control system 100 uses American National 448 Standards Institute/International Committee for Information Technology Standards (ANSI/INCITS) NGAC standard to control access over query 104 independent of application and to retain performance of database 124. In an embodiment, next generation access control system 100 automatically generates composite objects from schema 150 and expresses and enforces access control policies stored as access control data 114 in NGAC engine 112 in terms of those composite objects. Here, access manager 102, translator 108, and NGAC engine 112 manage access control policies and compute authorization responses 116. In an embodiment, access manager 102 traps and enforces policy over SQL queries 104 issued by applications 132. In an embodiment, translator 106 converts SQL query 104 to NGAC input 110 and translates authorization 116 from NGAC engine 112 to either access deny statement 130 or permitted SQL statement 120.

NGAC is a standard that includes: data elements and relations to express arbitrary access control policies in support of a wide variety of data services and applications; operations that include read and write, operations that can be performed on resource data, and administrative operations for configuring (e.g., creating and deleting) data elements and relations that represent policies; and functions for computing access control decisions and enforcing policy over user access requests to perform read/write and administrative operations. NGAC is a flexible access control framework and can be molded to support diverse access control policies. Further, in NGAC, access control policies are comprehensively enforced over its data services.

Included among NGAC's data elements and relations used to express and enforce policies are object attributes. Object attributes are containers that group and characterize data objects. Data objects and object attributes are placed into containers through an assignment relation. In next generation access control system 100, converter 150 converts schema 150 that includes columns and tables into NGAC object attributes 154 and NGAC assignments 156. Rows are object containers and can be converted by converter 150.

Also included among NGAC data elements and relations are user attributes, a set of operations, and three types of relations for specifying an access policy. Once schema 150 has been converted into GAC object attributes 154 and NGAC assignments 156, NGAC engine 112 configures NGAC relations to produce the access control policy in terms of NGAC object attributes 154 and NGAC assignments 156, using, e.g., NGAC's API. The resulting data elements and relations are stored in NGAC engine 112 as NGAC access control data 114. In addition to the conversion and the additional data elements and relations, next generation access control system 100 includes access manager 102 to trap SQL query 104 from application 132, and translator 106 to translate SQL query 104 along with a user identity to NGAC input 110 and NGAC authorization responses 116 to those inputs to either access deny statement 130 or permitted statement 120 (that can include SQL permitted query 122).

It is contemplated that access manager 102 and translator 106 communicate with application 132, database 124, and NGAC engine 112. Authorization flow in next generation access control system 100 can include receiving SQL query 104 from source 132 by access manager and sending query 104 to translator 106. Translator 106 translates query 104 into NGAC input 110 that is communicated to NGAC engine 112. Here, NGAC engine 112 computes using access control data 114 and renders an authorization response 116 that is communicated to translator 106. Translator 106 translates authorization response 116 into access deny statement 130 or permitted statement 120 that can include SQL permitted query 122 that is permitted for source 132 and that are communicated to access manager 102. Access manager 102 communicates permitted statement 120 to database 124. In the case of select operation 134, selected data 136 extracted from data 128 in database 124 is communicated to access manager 102 and then communicated to source 132. Depending on the type of query 104 (e.g. a SQL Select, Update, Insert, or Delete), translator 106 produces different NGAC input 110 to NGAC Engine 112.

Next generation access control system 100 expresses access control policies that stored as access control data 114 in terms of NGAC object attributes 154 that correspond to objects of schema 152.

Exemplary NGAC access control data 114 includes users, data objects, generic operations, and user and object attributes. NGAC engine 112 treats both user attributes and object attributes as containers. Containers are used in formulating and administering access policies and attributes. NGAC engine 112 expresses access policies through configurations of relations that include among others assignments (e.g., define membership in containers), associations (e.g., to derive privileges), and prohibitions (e.g., exceptions to privileges).

User attribute containers characterize their members and can represent user names, roles, affiliations, or other common characteristics pertinent to policy, such as security clearances. Object attribute containers characterize data by identifying collections of objects such as objects associated with a project, application, security classification, and the lie. Object containers can represent a table, column, or row.

NGAC engine 112 uses a tuple (x, y) to specify the assignment of element x to element y. The assignment relation implies containment, i.e., x is contained in y.

Figure 16:
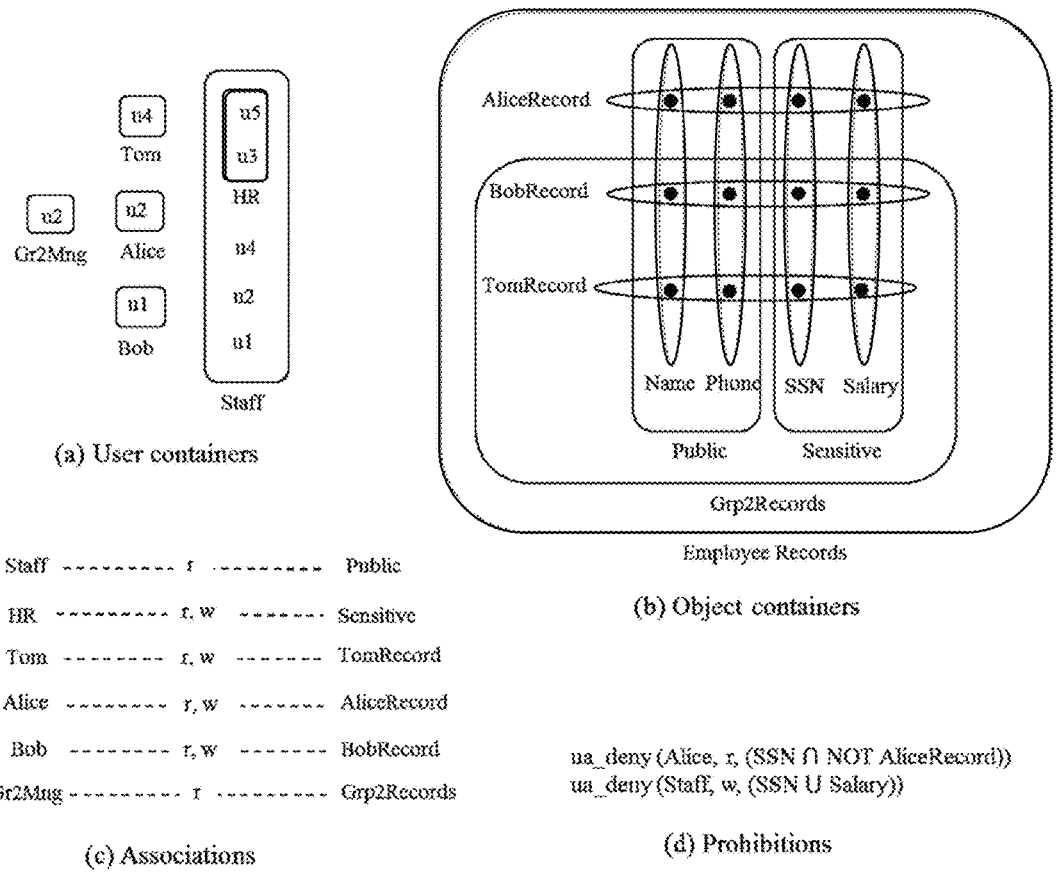
FIG. 16 shows an exemplary access control policy configuration.

Users and objects may be contained in one or more containers, and containers may be contained by or contain other containers. For object containers, this provides the representation of complex data structures such as relational database tables with distinguished fields. Rows of a table may be expressed as containers of data objects corresponding to the row's fields, and columns may be expressed as containers of data objects corresponding to column fields. Panel b of FIG. 16 shows an exemplary table and includes ovals to represent containers and dots to represent individual data objects. Vertically oriented ovals represent columns (e.g., name, phone, social security number (SSN), and salary), and horizontally oriented ovals represent rows (AliceRecord, BobRecord, and TomRecord). Intersections between the vertically oriented and horizontally oriented ovals represent fields in one or more tables. Panel b of FIG. 16 also shows a container of rows (Grp2Records) and two containers of columns (Public and Sensitive). Rows and columns are represented by object container labelled as EmployeeTable. Here, the containers labelled as EmployeeTable, Name, Phone, SSN, and Salary are object attributes automatically produced by converter 150. The other NGAC elements and relations can be produced through an NGAC administrative API by an authorized user. The authorized user can be a policy administrator, or the user (i.e., source 132) submitting query 104, such as Insert or Delete SQL queries.

Panel a of FIG. 16 shows user containers for grouping and characterization of users. The container labelled Staff includes three users (u1, u2, and u4), and container HR includes two users (u3, and u5). In addition, Panel a of FIG. 16 shows three containers Bob, Alice, and Tom that respectively contain users u1, u2, and u4. Panel a of FIG. 16 also shows Gr2Mng containing user u2.

NGAC engine 112 recognizes operations that include input and output operations (e.g., read and write) that can be performed on the contents of data objects, and also recognizes administrative operations that can be performed on NGAC data elements and relations that represent policies and attributes.

To be able to carry out an operation, one or more access rights are required. As with operations, two types of access rights apply: non-administrative access rights, and administrative access rights.

NGAC system 100 includes associations, wherein access rights to perform operations are acquired through associations. An association includes a triple that can be denoted by ua---ars---pe, wherein ua is a user attribute; ars is a set of access rights, and pe is a policy element, wherein pe can include a user attribute or an object attribute. The policy element pe in an association is used as a referent for itself and the policy elements contained by the policy element. The context of association ua---ars---pe is that the users contained in ua can execute the operations enabled by the access rights in ars on the policy elements referenced by pe. The set of referenced policy elements are dependent on and meaningful to the access rights in ars.

Panel c of FIG. 16 lists six association relations in terms of the user and object attributes (containers) illustrated in panels a and b. The set of referenced policy elements can depend on the access rights in ars. The policy element of each association can be an object attribute, and the access rights can be read/write. In the association HR---{r,w}---Sensitive, the policy elements referenced by Sensitive are data objects (the dots) contained in Sensitive such that user u3 and u5 can read and write those objects. If an association includes HR---{create assign-to}---Sensitive, where "create assign-to" is an administrative access right, then the policy elements referenced by Sensitive would be Sensitive, SSN, and Salary, wherein users u3 and u5 can create assignments to Sensitive, SSN, or Salary.

The access policy specified by the list of associations in panel c of FIG. 16 is as follows: Staff users can read Name and Phone fields of all records in EmployeeTable. In addition to being able to read Name and Phone fields, HR users can read and write SSN and Salary fields of all records in EmployeeTable. Bob, Tom, and Alice can read and write all fields (SSN, Salary, Name, and Phone) in their own record (respectively, BobRecord, TomRecord, and AliceRecord). Gr2Mng can read all fields (SSN, Salary, Name, and Phone) of all records in Gr2Reccords (i.e., BobRecord and TomRecord)

NGAC engine 112 in NGAC system 100 includes certain prohibitions. In addition to assignments and associations, NGAC engine 112 includes prohibition relations. Prohibition relations can specify privilege exceptions. One prohibition relations can be user attribute-deny. The user attribute-based deny relation is written as ua_deny(ua, ars, pes), wherein ua is a user attribute; ars is an access right set, and pes is a policy element set used as a referent for policy elements contained by the policy element. Here, in this relation, users assigned to ua cannot execute the operations enabled by the access rights in ars on the policy elements in pes.

Panel d of FIG. 16 shows prohibitions that constrain the access policy as follows: Staff users can read Name and Phone fields of all records in EmployeeTable. In addition to being able to read Name and Phone fields, HR users can read and write SSN and Salary fields of all records in EmployeeTable. Bob, Tom, and Alice can read all fields (SSN, Salary, Name, and Phone) and write to Name and Phone fields in their own record (respectively, BobRecord, TomRecord, and AliceRecord). Gr2Mng can read all fields of all records in Gr2Records with the exception of the SSN field.

An exemplary set of Employee Records with data content is shown in the top table of FIG. 17 under the object containers depicted in panel b of FIG. 16. The bottom three tables of FIG. 17 show access privileges for users u1, u2, and u3, under the access control policy expressed in FIG. 16, wherein in FIG. 17 read access is provided for all entries except for entries with read/write access that are indicated with an asterisk (*).

Translator 106 translates query 104 (e.g., a SQL query) provided by source 132 (e.g., an application) and an identity of the user of the application to NGAC input 110. Translator 106 also receives NGAC authorization response 116 to NGAC input 110 from NGAC engine 112, and translator 106 translates authorization response 116 to permitted statement 120 or an access deny statement 130 in response to a Select query or to a permitted statement 120 (e.g., GRANT) or deny statement 130 in the case of an Update query, Insert query, or Delete query. In some embodiments, translator 106 treats Select and Update queries differently from Insert and Delete queries because Select and Update queries can be mapped directly to NGAC read and write operations on data, and Insert and Delete operations can be mapped to create and delete administrative operations on NGAC object containers that correspond to rows.

For Select and Update queries, Select SQL statements include a specification of tables and columns from tables along with criteria for identifying rows from the table. Update SQL statements include a specification of a table with columns with criteria for identifying rows. Translating a requested Select query 104 to permitted SQL statement 120 or an Update query 104 to permitted query 122 or deny statement 130 is based on NGAC's ability to review access capabilities (also referred to a privileges) of users. next generation access control system 100 identifies a set of objects that are accessible to a user for either read for Select or write for Update, as well as attributes that contain those objects. For operations discussed below, use of row, column, or table is with respect to object attributes that correspond to those entities. Exemplary operations for Select and Update queries are included in the following paragraphs.

According to an embodiment, an operation for Select query includes: identifying a set of rows in the table of the Select SQL statement that contain objects accessible by the user under the read operation; for each row identified, identifying a maximal set of columns that is a subset of the columns in the Select statement and each identified column contains an object that is also contained in the row. These columns are said to be associated with the row; for each row, column association, removing the columns that are also included in any deny relation for the user with respect to read; for each subset of identified rows so that each row in the subset has a common associated set of columns, generating a Select SQL statement for that set of columns with the original table and original condition augmented with a condition that limits the Select to the subset of identified rows; and if the set of rows or columns are empty, translator 106 produces deny statement 130.

According to an embodiment, an operation for Update query includes: identifying the set of rows in the SQL database that meet the criteria included in the Update SQL statement; identifying a set of rows in the table of the Update SQL statement containing objects accessible by the user under the write operation; if the rows identified in the first step are a subset of those identified in the second step, proceed to the next step, otherwise deny access; for each row identified in the first step, verifying the existence of objects common to the row and the set of columns included in the SQL Update statement. If the condition fails, deny access, otherwise proceed to the next step; and for the columns included in the SQL Update statement, verifying that the columns are not included in any deny relation for the user. If the condition holds, GRANT the SQL Update Statement by producing permitted statement 120, otherwise deny access by producing deny statement 130.

According to an embodiment, an operation for Delete query and Insert query includes the following. The execution of a SQL Delete statement removes one or more rows from a table in data 128 in database 124 in accordance with criteria included in the statement. next generation access control system 100 grants or denies a user's request to delete one or more rows in a table in database 104 and in the case of granting access, subsequently deletes the corresponding NGAC object attributes and relations. The execution of a SQL Insert statement creates a new row with specified column values, in a specified table in database 124. Next generation access control system 100 grants or denies a user's request to insert a row in database 124, and in the case of granting access, subsequently creates an NGAC object attribute corresponding to the row and creates objects (representing the values) and assigns those objects to the row attribute and appropriate column attributes. A user's capability to perform a SQL Delete or Insert operation is dependent on the existence of administrative privileges.

Creating and deleting objects, object attributes, and assignments are achieved through execution of administrative operations. A user's capabilities to execute administrative operations are established through administrative privileges.

Administrative operations are implemented using parameterized routines, prefixed by a precondition, with a body that describes how a data set or relation (denoted by Y) changes to Y'. The precondition tests the validity of the actual parameters. If the condition evaluates to false, then the routine fails as follows:

$$\text{Rtnname } (x_1, x_2, \ldots, x_k) \{$$
$$\ldots\text{preconditions}\ldots$$
$$\{$$
$$Y' = f(Y, x_1, x_2, \ldots, x_k)$$
$$\}$$

In an embodiment, the administrative operation CreateOinOA shown below specifies the creation of an object x and assigning the object to an object attribute y. The preconditions here stipulate that x parameter is not a member of objects (O) and y parameter is a member of object attributes (OA). The body describes the addition of the x to the set of objects (O) which changes the state of the set to O' and the addition of the tuple (x, y) to the set of assignments (ASSIGN) relation, which changes the state of the relation to ASSIGN', as follows:

$$\text{CreateOinOA}(x, y)$$
$$x \notin O \land y \in OA$$
$$\{$$
$$O' = O \cup \{x\}$$
$$\text{ASSIGN}' = \text{ASSIGN} \cup \{(x, y)\}$$
$$\}$$

Each administrative routine entails a modification to the NGAC configuration.

According to an embodiment, to execute an administrative operation the requesting user possesses appropriate access rights. Just as access rights to perform read/write operations on data objects are defined in terms of associations, so too are capabilities to perform administrative operations on policy elements and relations.

The following two associations are considered in support of the configuration depicted by panel b of FIG. 16:

TableAdmin---{create-oa, create-o, create ooa}---EmployeeTable
TableAdmin---{delete-o, delete-oa, delete-ooa, delete-oaoa}---EmployeeTable The first association provides that a user assigned to TableAdmin can create an object attribute (e.g., corresponding to a row) assigned to an object attribute (e.g., EmployeeTable) in EmployeeTable; create an object assigned to an object attribute (e.g., an existing row) in EmployeeTable; and create an object to object-attribute assignment from an object (e.g., an object in a row) to an object attribute (e.g., corresponding to a column) in EmployeeTable.

The second association provides that a user assigned to TableAdmin can delete an object to object-attribute assignment (e.g., delete object assignments to attributes corresponding to a row and column) in EmployeeTable; delete an object in EmployeeTable; delete an object-attribute to object-attribute assignment (e.g., a row assigned to EmployeeTable) in EmployeeTable; and delete an object attribute (e.g., corresponding to a row) in EmployeeTable.

The administrative operations to insert or delete an object container corresponding row in another object container corresponding to a table can be executed on an individual basis or can be executed as an NGAC administrative routine.

An administrative routine includes a parameterized interface and a sequence of administrative operation invocations. The body of an administrative routine is executed as an atomic transaction. An error or lack of user privileges that causes any of the constituent operations to fail execution causes the entire routine to fail, producing the same effect as though none of the operations were ever executed.

The following operation (e.g., in context of panel b of FIG. 16) creates an object attribute (corresponding to a row) assigned to EmployeeTable, creates new objects (corresponding to values), and assigns those objects to object attributes (corresponding to columns) and the object attribute corresponding to the row. The columns Name, Phone, SSN, and Salary are assigned to the object attribute EmployeeTable.

```
Insert_Row_in EmployeeTable(row, name, phone, ssn, salary)
{    CreateOAinOA(row, EmployeeTable)
     CreateOinOA(name, row)
     Assign(name, Name)
     CreateOinOA(phone, row)
     Assign(phone, Phone)
     CreateOinOA(ssn, row)
     Assign(ssn, SSN)
     CreateOinOA(salary, row)
     Assign(salary, Salary)
}
```

Although the Insert routine applies to the object attributes corresponding to the example schema of FIG. 16, a similar and corresponding routine can be automatically created for each table of an RDBMS schema or an Insert routine could exist that uses a template specific to each table.

An administrative Delete routine could be used to delete an object attribute, objects and assignments corresponding to a RDMBS row, and column values. An exemplary routine is provided for deletion in the context of panel b of FIG. 16:

```
Delete_Row_from_EmployeeTable(row)
{    For each object obj in row {
         DeleteO (obj) /*includes deletion of assignments of obj*/
     }
     DeleteOAinOA(row, EmployeeTable) /*includes deletion of assignments
     row to EmployeeTable*/
}
```

Similar to Insert, a Delete routine can be automatically created for each table of an RDBMS schema or a generic Delete routine could exist that uses a template specific to each table.

Administrative routines allow consistence between RDBMS rows and corresponding NGAC object attributes, objects, and assignments and also provide testing a user's authority to Insert and Delete RDBMS rows.

According to an embodiment, to perform Insert, an algorithm for translating an Insert statement to an NGAC authorization response assumes the existence of an NGAC administrative Insert routine. The algorithm can be as follows: invoking the routine corresponding to the table specified in the Insert statement, using the identity of the user that issued the Insert statement with the specified row, and column values, thereby creating an object attribute that corresponds to the row, creating objects that represent and correspond to column values that are assigned to the row and are appropriately assigned to object attributes that correspond to columns; and if the routine successfully executes, granting the SQL Insert statement, otherwise denying access.

According to an embodiment, to perform Delete, an algorithm for translating a Delete statement to an NGAC authorization response assumes the existence of an NGAC administrative Delete routine, particularized for the referenced table. The algorithm can be as follows: identifying the set of rows in the SQL database that meet the criteria included in the Delete SQL statement; for each row identified in the prior step, and sequentially invoking, using the identity of the user that issued the statement, the Delete routine of the table specified in the Delete statement, using and caching the parameters of the object attribute corresponding to the identified row, and the objects contained in the object attribute. If any invocation of the routine fails to successfully execute, deny the SQL Delete statement and roll back changes due to previous invocations by applying the cache as NGAC administrative Insert routine parameters, otherwise grant the request.

Source 132 provides query 104. Source 132 provides query 104. Source 132 can be any entity with a unique identifier that issues queries to a database to include a human user, a device, or an application running as a process on behalf of a human user. Regardless of the source, human or non-human, their identities are referred to as user identifiers. In the case of a human user, the source may issue queries to obtain information for a variety of purposes such as "give me all the employees that live in Virginia and are fifty years of age or older?" In the case of a device, the source might be a sensor that needs to collect, monitor and react to data. In the case of an application, the source can present its user with one or more screens that can be parameterized and, as a consequence, can extract data, alter data, create a record, delete a record in a database, or a combination thereof. The source 132 issues the query 104 accompanied by its unique identifier.

Query 104 can be a sequence of statements for instructing the extraction of data, alteration of data, creation or deletion of structures in a database, or a combination thereof. One form of query 104 includes a set of queries defined in the standard structured query language (SQL) applied to relational databases. SQL queries include four basic types of operations—Select, Insert, Update, and Delete. These four operations respectively read, create, write, and delete data in tables. A Select SQL statement includes a specification of one or more tables and one or more columns from those tables along with criteria for identifying rows from the table or tables. An Update SQL statement includes a specification of one table with one or more columns with criteria for identifying rows. A SQL Delete statement removes one or more rows from a table in accordance with criteria included in the statement. An Update SQL statement includes a specification of one table with one or more columns with criteria for identifying rows. Exemplary queries 104 include "Select Name From Employee Where Salary >60,000."

Access manager 102 receives query 104. Access manager 102 can be a proxy server. As such, access manager 102 is interposed between source 132 (which is a client of database 124) and a database server (which manages database 124). Source 102 connects to access manager 102 with credentials, e.g., a source identifier, instead of connecting to the server. As a proxy server, access manger 102 intercepts query 104 and the unique identifier of source 132. The proxy can be instructed with what to do with query 104. Access manager 102 submits query 104 (that in an absence of access manager 102 would be sent to database 124) and the source identifier to translator 106. Translator 106 sends back to access manager 102 either a permitted query or an access denied message. Access manager 102, in the case of a permitted query, communicates query 104 to database 124, and receives a status and possibly a data set that is communicated to source 132.

Translator 106 receives query 104 from access manager 102. Translator 106 can be implemented as hardware or as a software module that may be installed and reside on the same server as that of NGAC engine 112. Translator 106 receives query 104 and an identity of the user from access manager 102. Translator 106 translates query 104 (e.g., a SQL query) provided by source 132 (e.g., an application) and an identity of the user of the application to NGAC input 110. Translator 106 also receives NGAC authorization response 116 to NGAC input 110 from NGAC engine 112, and translator 106 translates authorization response 116 to permitted statement 120 or an access deny statement 130 in response to a Select query or to a permitted statement 120 (e.g., GRANT) or deny statement 130 in the case of an Update query, Insert query, or Delete query. Finding rows columns and fields with various properties in the translation algorithms is performed by identifying NGAC elements and relations in access control data 114 that correspond to database schema in database 124.

Translation of select statement issued by source 132 to permitted select statements or to a deny message includes the following steps: (a) identifying a set of rows in the SQL database 124 that meet the criteria included in select statement 104 using communication channel 300 (see e.g., FIG. 1, which can be included in other embodiments but not shown explicitly in some figures herein) between translator 106 and database 124; (b) identifying a set of rows extracted from those found in step (a) that contain a field for which the user has read access; (c) for each row identified in step (b) identifying a maximal set of columns (MSC) that: is a subset of the columns in the select statement and each column from this subset MSC contains an object that is also in that row; (d) for each row and columns associated in step (c) removing the columns for which the read access is denied for the user; and (e) letting (row1, columns1), . . . , (rown, columnsn) the pairs of rows and column sets identified in the steps (a-d). The process also include grouping together those with the same column set. For each group, the process generates a select statement for the common column set and for the rows in the group. Here, if the pairs identified are (row1, {col1, col2}), (row3, {col1, col2}), (row2, {col3}), then the generated select statements would be: Select col1, col2 from tbl.row1, tbl.row3; Select col3 from tbl.row2; (f) if the set of rows or columns are empty the translator 106 issues a deny access message to access manager 102.

Translation of update SQL statement to permitted SQL statements or to a deny message includes: (a) identifying the set of rows in the SQL database 124 that meet the criteria included in the update statement 104 using the communication channel 300 between translator 106 and database 124; (b) identifying a set of rows in the table of the update statement containing objects accessible by the user under the write operation; (c) if the rows identified in step (a) are a subset of those identified in step (b), proceeding to step (c), otherwise translator 106 issues a deny access to access manager 102, (d) For each row identified in step (a), verify the existence of objects common to the row and the set of columns included in the update statement, if the condition fails, translator 106 issues a deny access to access manager 102, otherwise proceed to step (e); and (e) for the columns included in the SQL update statement, verify that the columns are not included in any deny relation for the user, if the condition holds, the translator 106 issues update statement to access manager 102, otherwise translator 106 issues a deny access to access manager 102.

NGAC engine 112 receives query NGAC input 110. NGAC engine 112 may be implemented is a partial or complete implementation of the ANSI/NICITS standard that minimally includes a Policy Decision Point server for computing access decisions over user access requests with functionality for identifying objects and object attributes that are accessible to a user, an access control database, with administrative commands and routines and an API for configuring NGAC policy elements and relations, such as the Policy Machine open source implementation available from Github.

NGAC input 110 is produced by translator 106. NGAC input 110 can be implemented as a request message issued by a user in the form of a protocol or call to an API to perform standard NGAC administrative operations and routines used for translation, such as identifying a user's access rights to objects that are included in containers that correspond to database 124 columns and rows.

Access control data 114 is provided in NGAC engine 112. Access control data 114 can be implemented as NGAC standard data elements and relations. Included among these elements and relations are users, objects, user attributes, object attributes, policy classes, assignments, associations, and prohibitions. Such elements and relations can be represented and stored in variety of systems such as a SQL database or a directory service such as Active Directory. Access control data 114 is created through administrative operations and administrative routines. The Policy Machine Github open source implementation includes an administrative tool for visualizing and managing access control data 114.

Authorization response 116 is provided to translator 106 from NGAC engine 112. Authorization response 116 can be implemented as a message providing information in response to NGAC inputs 110. This information is generated through invocations of standard NGAC administrative operations and routines.

Response statement 118 is produced by translator 106. Response statement 118 can be implemented as a protocol or call to an access manager API for conveying status information regarding access decisions to access manager 102.

Permitted query 122 is provided by access manager 102 to database 124. Permitted query 122 can be can be implemented as a protocol or call to an access manager API for conveying permitted queries to the access manager 102 for its submittal to the database 124.

Database 124 includes data 128. Database 124 can pre-exist as and housed by any commercially available relational database management system. Exemplary data 120 patient medical records, personally identifiable information, academic records, criminal records, court dockets, web site content, site plans, deeds, state records, county records, city records, financial data, mortgage data, laboratory data, and the like without limitation to form or content.

Converter 150 Communicates with database 124 and NGAC engine 112. Converter 150 can be implemented in software and a tool for converting schema data such as tables and column found in an existing database to NGAC access control data 114. Though the use of converter NGAC objects, object attribute, and assignments can be automatically created and named in a manner that corresponds schema data such tables and columns, and existing rows and data. Converter 150 can provide a starting point for formulating policies in terms the created object, object attributes, and assignments that correspond to actual tables, column, and rows in an existing database 124, which can be augmented with other NGAC relations in formulating policy.

Schema 152 provides organization of data 120 in database 124. Schema 152 preexists and is a component of many database management systems.

NGAC object attributes 154 are provided by converter 150 to NGAC engine 112. NGAC object attributes 154 represent named collections of objects and other object attributes. NGAC object attributes 154 can represent composite object with complex structures such as tables.

NGAC assignments 156 are provided by converter 150 to NGAC engine 112. NGAC assignments 156 are used to formulate containment of objects into object attributes, object attributes into object attributes. NGAC assignments 156 provide the basis for creation of composite objects that realize complex structures such as tables.

Next generation access control system 100 has beneficial and advantageous properties including its ability to visualize and formulate combinations of a wide variety of access control policies to include discretionary access control, role based access control, history-based policies for the enforcement of separation of duty and conflicts of interest. Also advantages is next generation access control system 100 ability to efficiently conduct reviews of its policies, such as identifying the objects that are accessible to a user under the read operation or identifying the consequence of assigning a user to an attribute.

In an embodiment, access manager 102, translator 106, and converter 106 of next generation access control system 100 are provided as a kernel loadable module (KLM). The kernel loadable module (also referred to as a kernel module (KMOD)) can be an object file that includes code to extend a running kernel or base kernel of an operating system with a modular kernel. Some Unix-like systems and Microsoft Windows support kernel loadable modules although they might use a different name for KLMs, such as kernel extension (also referred to as a kext) in the Apple Macintosh OS X. KLMs can support hardware, file systems, or system calls. To provide functionality of a KLM, loading is initiated by the operating system, and the KLM is allocated space in memory. The KLM can be terminated by unloading the KLM, which frees memory.

Figure 18:
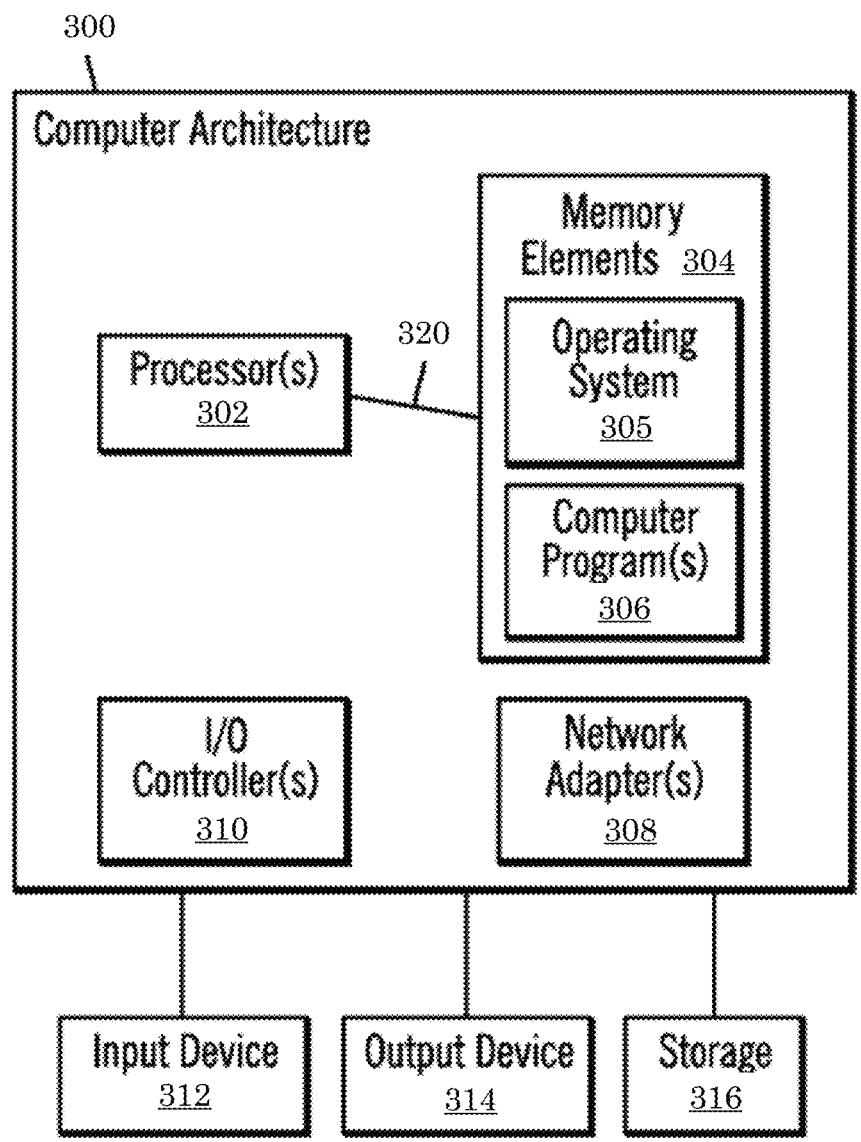
FIG. 18 shows a computer architecture that may be used in accordance with certain embodiments.

Next generation access control system 100 be implemented as hardware (e.g., hardware logic or circuitry), software, or a combination of hardware and software. FIG. 18 shows computer architecture 300 that may be used in accordance with certain embodiments. Server computer 100 may implement computer architecture 300. The computer architecture 300 can store or execute program code and includes processor 302 coupled directly or indirectly to memory elements 304 through system bus 320. Memory elements 304 can include local memory employed during execution of the program code, bulk storage, and cache memories to provide temporary storage of program code to reduce a number of times code is retrieved from bulk storage during execution. Memory elements 304 include operating system 305 and computer programs 306. Input/Output (I/O) devices 312, 314 can include, e.g., keyboards, displays, pointing devices, and the like that can be coupled to the system through intervening I/O controllers 310. Network adapters 308 can couple to the system to enable communication with a data processing system, remote printer, storage device, and the like through intervening private or public networks. Modems, cable modem, and Ethernet cards are just a few types of network adapters 308. Computer architecture 300 can be coupled to storage 316 (e.g., a non-volatile storage area, such as magnetic disk drives, optical disk drives, a tape drive, and the lie.). Storage 316 can include an internal storage device or an attached or network accessible storage. Computer programs 306 in storage 316 can be loaded into memory elements 304 and executed by processor 302. Computer architecture 300 can include fewer components than illustrated, additional components not illustrated herein, or some combination of the components illustrated and additional components. Computer architecture 300 can include a computing device such as a mainframe, server, personal computer, workstation, laptop, handheld computer, telephony device, network appliance, virtualization device, storage controller, and the like.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Of course, wherever a component of the described subject matter is implemented as software, the component can be implemented as a script, as a standalone program, as part of a larger program, as a plurality of separate scripts or programs, as a statically or dynamically linked library, as a kernel loadable module, as a device driver, or in every and any other way known now or in the future to those of skill in the art of computer programming or computer engineering. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A computer-implemented method, comprising:
   receiving, by an access manager, a query from a source;
   communicating the query from the access manager to a translator;
   translating, by the translator, the query into a next generation access control (NGAC) input;
   communicating the NGAC input to an NGAC engine, the NGAC engine comprising access control data (ACD);
   receiving, by the NGAC engine, the NGAC input;
   determining an authorization response by analyzing the access control data in response to receipt of the NGAC input by the NGAC engine;
   communicating the authorization response from the NGAC engine to the translator;
   translating, by the translator, the authorization response into a response statement;
   communicating the response statement to the access manager from the translator;
   communicating, if the response statement comprises a permitted statement:
     a permitted query to a database from the access manager, the permitted query comprising a data operation; and
     performing the data operation on data in the database;
   blocking access by the source to data in the database if the response statement comprises a deny statement;
   communicating a schema from the database to a converter, the schema comprising a plurality of columns and tables;
   receiving the schema by the converter; and
   converting, by the converter, the schema from the database to produce:
     a plurality of NGAC object attributes; and
     a plurality of NGAC assignments.

2. The computer-implemented method of claim 1, further comprising:
   communicating the NGAC object attributes and the NGAC assignments from the converter to the NGAC engine.

3. The computer-implemented method of claim 2, further comprising:
   receiving, by the NGAC engine, the NGAC object attributes and the NGAC assignments from the converter; and
   generating, by the NGAC engine, an access control policy from the NGAC object attributes and the NGAC assignments; and
   storing the access control policy as the access control data in the NGAC engine.

4. The computer-implemented method of claim 1, wherein the response statement comprises the permitted statement, and the data operation comprises a select operation; and
   the method further comprises:
     performing the select operation on the data in the database to produce selected data;
     communicating the selected data to the access manager; and
     communicating the selected data from the access manager to the source of the query.

5. The computer-implemented method of claim 1, wherein the response statement comprises the permitted statement, and the data operation comprises an update operation; and
   the method further comprises:
     performing the update operation on the data in the database to produce updated data in the database.

6. The computer-implemented method of claim 1, wherein the response statement comprises the permitted statement, and the data operation comprises an insert operation; and the method further comprises:

performing the insert operation on the data in the database to produce inserted data in the database.

7. The computer-implemented method of claim 1, wherein the response statement comprises the permitted statement, and the data operation comprises a delete operation; and the method further comprises:

performing the delete operation on the data in the database to delete a portion of the data in the database.

8. The computer-implemented method of claim wherein the query comprises a structured query language (SQL) query.

9. The computer-implemented method of claim 1, wherein the database comprises a relational database.

10. The computer-implemented method of claim 1, wherein source comprises a user application.

11. A system comprising:

one or more computers configured to perform operations, the operations comprising:

receiving, by an access manager, a query from a source;

communicating the query from the access manager to a translator;

translating, by the translator, the query into a next generation access control (NGAC) input;

communicating the NGAC input to an NGAC engine, the NGAC engine comprising access control data (ACD);

receiving, by the NGAC engine, the NGAC input;

determining an authorization response by analyzing the NGAC data in response to receipt of the NGAC input by the NGAC engine;

communicating the authorization response from the NGAC engine to the translator;

translating, by the translator, the authorization response into a response statement;

communicating the response statement to the access manager from the translator;

communicating, if the response statement comprises a permitted statement:

a permitted query to a database from the access manager, the permitted query comprising a data operation; and performing the data operation on data in the database;

blocking access by the source to data in the database if the response statement comprises a deny statement;

communicating a schema from the database to a converter, the schema comprising a plurality of columns and tables;

receiving the schema by the converter; and converting, by the converter, the schema from the database to produce:

a plurality of NGAC object attributes; and a plurality of NGAC assignments.

12. The system of claim 11, further comprising:

communicating the NGAC object attributes and the NGAC assignments from the converter to the NGAC engine.

13. The system of claim 12, further comprising:

receiving, by the NGAC engine, the NGAC object attributes and the NGAC assignments from the converter; and generating, by the NGAC engine, an access control policy from the GAC object attributes and the NGAC assignments; and storing the access control policy as the access control data in the NGAC engine.

14. The system of claim 11, wherein the response statement comprises the permitted statement, and the data operation comprises a select operation; and the method further comprises:

performing the select operation on the data in the database to produce selected data;

communicating the selected data to the access manager; and communicating the selected data from the access manager to the source of the query.

15. The system of claim 11, wherein the response statement comprises the permitted statement, and the data operation comprises an update operation; and the method further comprises:

performing the update operation on the data in the database to produce updated data in the database.

16. The system of claim 11, wherein the response statement comprises the permitted statement, and the data operation comprises an insert operation; and the method further comprises:

performing the insert operation on the data in the database to produce inserted data in the database.

17. The system of claim 11, wherein the response statement comprises the permitted statement, and the data operation comprises a delete operation; and the method further comprises:

performing the delete operation on the data in the database to delete a portion of the data in the database.

18. The system of claim 11, wherein the query comprises a structured query language (SQL) query.

19. The system of claim 11, wherein the database comprises a relational database.

20. The system of claim 11, wherein source comprises a user application.

* * * * *